United States Patent [19]
Hillson et al.

[11] Patent Number: 6,094,644
[45] Date of Patent: Jul. 25, 2000

[54] METHOD AND APPARATUS FOR RECORDING ACTUAL TIME USED BY A SERVICE WHICH MAKES REQUESTS FOR DATA

[75] Inventors: Andrew Raines Hillson; Douglas Brock Dickie, both of Calgary, Canada

[73] Assignee: Nortel Networks Corporation, Montreal, Canada

[21] Appl. No.: 08/928,518

[22] Filed: Sep. 12, 1997

[51] Int. Cl.[7] .................................................. G06F 17/60
[52] U.S. Cl. ........................ 705/400; 377/13; 377/14; 377/15; 377/16; 379/100.04; 455/405; 455/406; 705/418
[58] Field of Search .................................. 377/13, 14, 15, 377/16; 379/100.04, 111, 114; 455/405, 406, 407, 408; 705/30, 400, 418

[56] References Cited

U.S. PATENT DOCUMENTS

| | | | |
|---|---|---|---|
| D. 378,082 | 2/1997 | Wilson | D14/100 |
| 4,900,905 | 2/1990 | Pusic | 235/381 |
| 5,146,491 | 9/1992 | Silver et al. | 379/114 |
| 5,174,056 | 12/1992 | King | 40/574 |
| 5,393,964 | 2/1995 | Hamilton et al. | 79/453 |
| 5,481,534 | 1/1996 | Beachy et al. | 379/114 |
| 5,504,744 | 4/1996 | Adams et al. | 370/60.1 |
| 5,602,905 | 2/1997 | Mettke | 379/96 |
| 5,710,807 | 1/1998 | Smith | 379/114 |
| 5,710,918 | 1/1998 | Lagarde et al. | 395/610 |
| 5,729,594 | 3/1998 | Klingman | 379/93.12 |
| 5,761,071 | 6/1998 | Bernstein et al. | 364/479.07 |
| 5,812,765 | 9/1998 | Curtis | 395/200.3 |
| 5,822,215 | 10/1998 | Hohmann et al. | 364/479.01 |
| 5,845,267 | 12/1998 | Ronen | 379/114 |
| 5,875,110 | 2/1999 | Jacobs | 364/479.02 |
| 5,881,141 | 3/1999 | Park | 379/155 |
| 5,920,613 | 7/1999 | Alcott et al. | 379/114 |

OTHER PUBLICATIONS

King Products Website Plynth Product Brochure, http://www.kingproducts.com/miko/plynth/plynth.html, pp. 1/4 to 4/4, as of Dec. 15, 1997.
King Products Website Sidelight Product Brochure http://www.kingproducts.com/miko/sidelight.html, pp. 1/4 to 4/4, as of Dec. 15, 1997.
King Products Website Technical Note http://www.king-products.com/miko/technology/Tech.html#platforms, pp. 1/5 to 5/5, as of Dec. 15, 1997.
Absolu Technologies Payphone Product at website http://www/absolu.qc.ca/english/m2p2_tec.html, p. 1/1, as of Dec. 15, 1997.
Atcom Inc. Payphone Cyberbooth Unit Product Brochure at website http://ww.atcominfo.com/compactpics.html, p. 1/1, as of Dec. 15, 1997.
Atcom Inc. Compact Cyberbooth Unit Product Brochure at website http://ww.atcominfo.com/cptcybpr.html, p. 1/1, as of Dec. 15, 1997.
Atcom Inc. Cyberbooth Kiosk Unit Product Brochure at website http://ww.atcominfo.com/kioskpics.html, p. 1/1, as of Dec. 15, 1997.
Atcom Inc. Cyberbooth Wall Unit Product Brochure at website http://ww.atcominfo.com/wallpics.html, p. 1/1, as of De., 15, 1997.

*Primary Examiner*—Edward R. Cosimano

[57] ABSTRACT

An apparatus and method for recording actual time used by a service which makes requests for data. The apparatus includes a first timer for recording time during which the service is in operation and a second timer rendered operable when the service requests data. The second timer is operable to disable the first timer to suspend the recording of the time when the second timer acquires a value exceeding a predefined value, representing the time during which the service is waiting for data in response to a request for data and the second timer re-enables the first timer when the data is received.

28 Claims, 17 Drawing Sheets

SERVICE RECORD
↗ 231

| SERVICE ID | SERVICE TYPE | SERVICE RATE |
|---|---|---|
| " | " | " |
| " | " | " |
| " | " | " |

SERVICE USAGE RECORD
↗ 238

| TRANSACTION ID | SERVICE ID | DATE/TIME | DURATION | CHARGE | PAYMENT METHOD | CARD NUMBER |
|---|---|---|---|---|---|---|
| " | " | " | " | " | " | " |
| " | " | " | " | " | " | " |
| " | " | " | " | " | " | " |

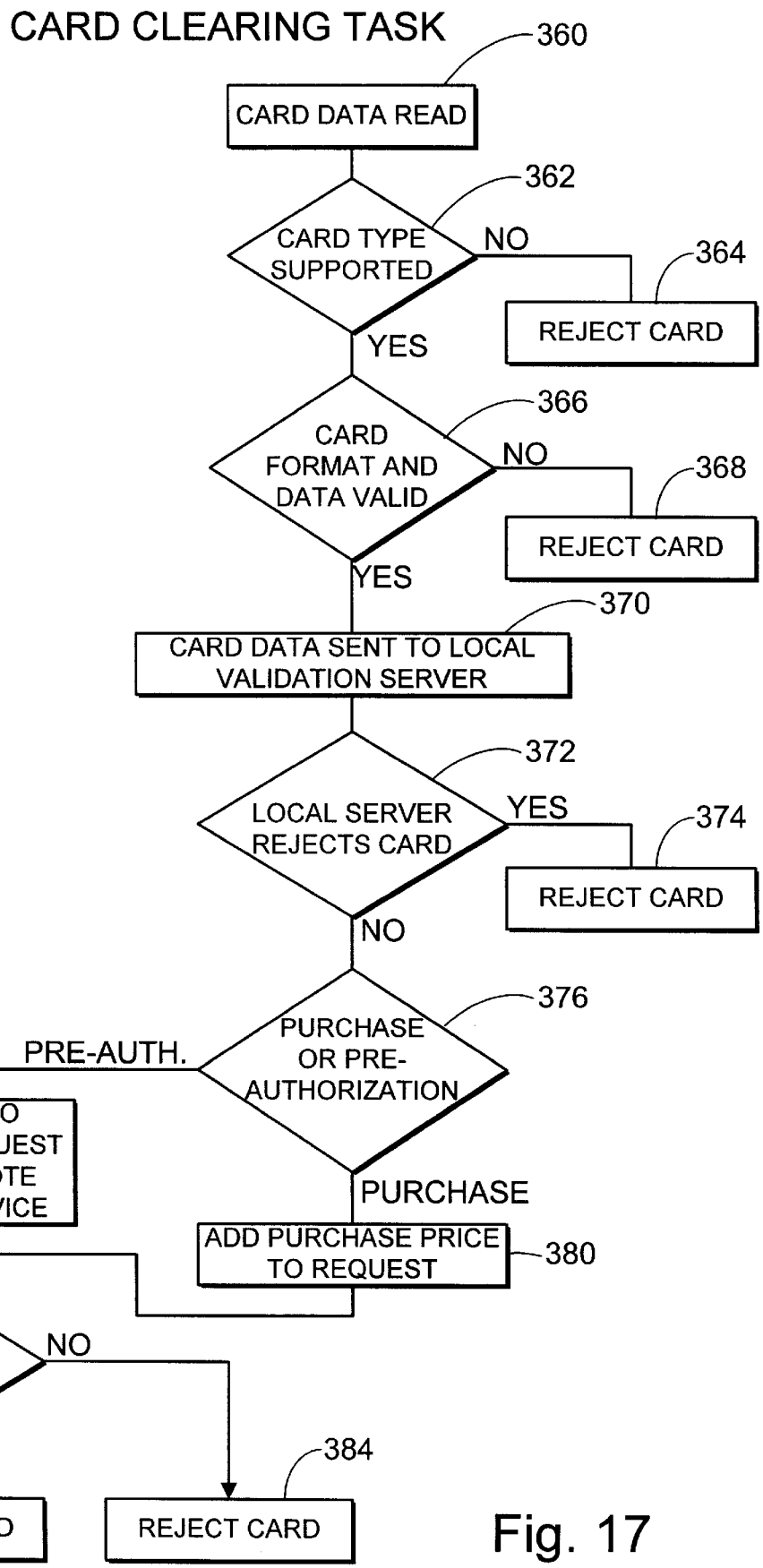

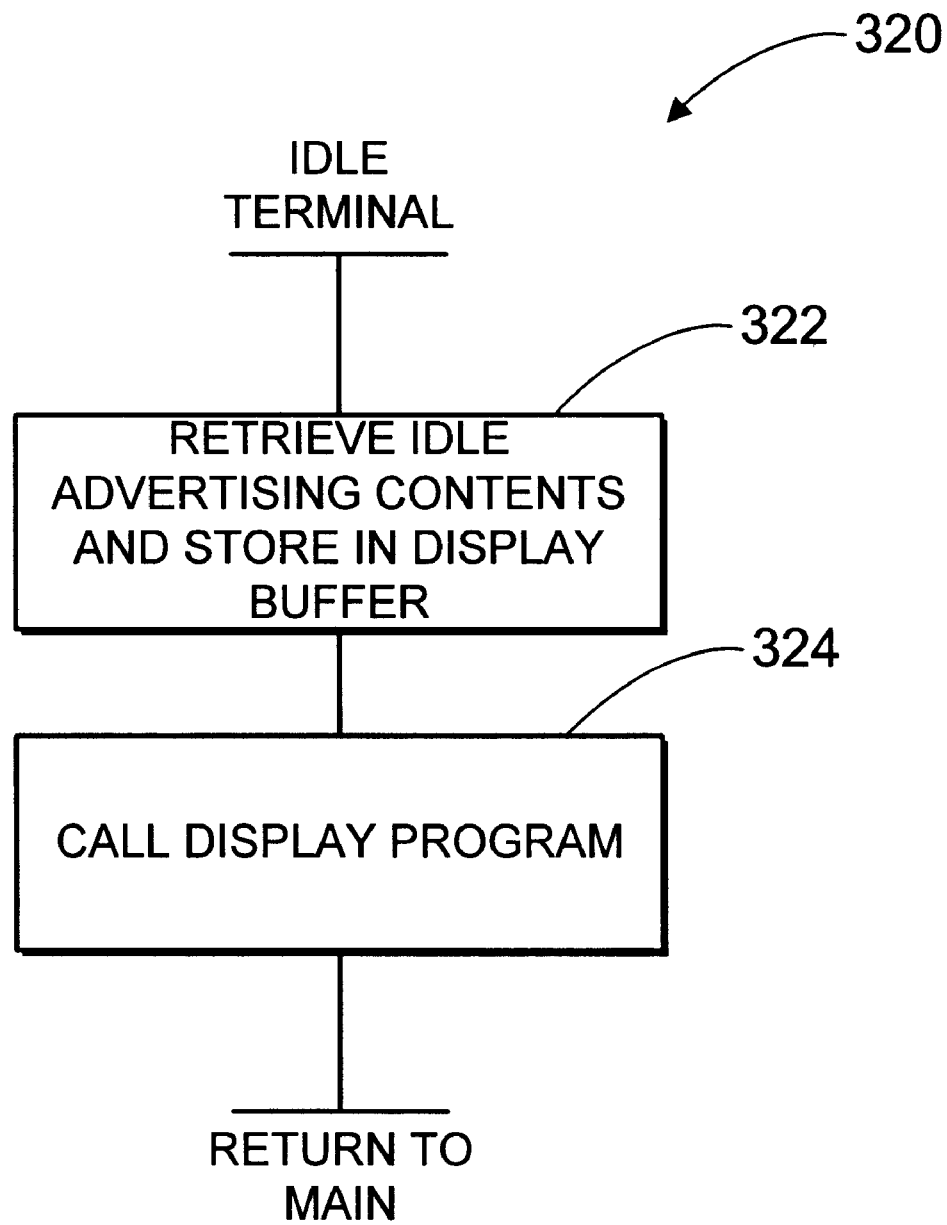

METHOD AND APPARATUS FOR RECORDING ACTUAL TIME USED BY A SERVICE WHICH MAKES REQUESTS FOR DATA

FIELD OF THE INVENTION

This invention relates to a method and apparatus for recording actual time used by method and apparatus for recording actual time used by a service which makes requests for data.

BACKGROUND OF THE INVENTION

Pay telephones are common in the prior art. With the recent advent of multimedia, it is desirable to vend multimedia services at a multimedia services terminal, much in a similar way to the way in the which public pay phone services are provided.

With the advent of new payment methods including credit cards, debit cards and the like, it is desirable that users be able to pay for services rendered by a public terminal using any one of the available payment options. Requesting a user to initiate payment multiple times during a session is not acceptable. It would be desirable therefore to provide a method of paying once for unlimited service usage during a session.

Generally, public terminals charge a user either a set fee or charge by the minute, irrespective of the response of the terminal as seen by the user. Delays in such responses may be due to delays in receiving data from a network and it is not acceptable to expect a user to pay for delays or resource problems experienced by the network. Rather, the user should only be charged for actual, legitimate transfers of data. The present invention addresses these and other needs.

SUMMARY OF THE INVENTION

In accordance with one aspect of the invention, there is provided a method of recording actual time used by a service which makes requests for data. The method includes the steps of:

a) recording time during which the service is in operation; and b) suspending the recording of the time during periods exceeding a pre-defined duration, during which the service is waiting for data in response to a request for data.

Preferably, the method includes the steps of:

a) starting a first timer in response to a request for access to the service;

b) starting a second timer in response to transmission of a request for data;

c) checking the second timer to determine whether or not it holds a value greater than a pre-defined value and disabling the first timer when the second timer holds a value greater than the pre-defined value; and d) re-enabling the first timer when the data is received.

Preferably, the method includes the step of producing a billing record identifying the service, the time value accumulated on the first timer and a charge amount associated with the service, the charge amount being calculated from rate information associated with the service and the time indicated by the first timer.

Preferably, the method includes the steps of:

a) recording times during which a plurality of respective services are in operation; and b) suspending the recording of the time for each service waiting for data for a period of time greater than a pre-determined time until the data is received.

Preferably, the method includes the steps of:

a) starting respective first timers in response to respective requests for access to the data;

b) starting respective second timers in response to transmission of respective requests for the data;

c) checking each of the respective second timers to determine whether or not any of the second timers holds a value greater than the pre-defined value and disabling the first timers associated with each service having a second timer with a value greater than the pre-defined value; and d) re-enabling the first timers associated with each service which has received a response to its request for data.

Preferably, the method includes the step of storing a plurality of pre-defined values and associating separate pre-defined values with each service.

Preferably, the method includes the step of producing a billing record identifying each service requested by the user, each time value accumulated on each first timer associated with each service requested by the user respectively and a charge amount associated with each service, the charge amount being calculated from rate information associated with each service respectively and the time indicated by the first timers associated with each service respectively.

In accordance with another aspect of the invention, there is provided a method of recording actual time used by a service, the method comprising the steps of:

a) recording time during a period in which the service is in operation and a rate at which data is received is greater than a pre-defined rate; and b) suspending the recording of the time during periods during which the rate at which data is received is less than a pre-defined rate.

Preferably, the method includes the steps of:

a) enabling a first timer in response to a request for usage of at least one of the services;

b) determining a receive data rate at which data is received in response to the request; and c) comparing the receive data rate with a pre-defined rate value and disabling the first timer when the pre-defined rate value is less than the pre-defined data rate value and re-enabling the first timer when the receive data rate exceeds the pre-defined rate.

Preferably, the method includes the steps of:

a) recording times associated with a plurality of services respectively, while data is received at the service at a rate exceeding a pre-defined rate; and b) suspending the recording of the time for at least one of the services during periods when data is received at a rate less than the pre-defined rate.

Preferably, the method includes the steps of:

a) enabling timers associated with respective services in response to a request for usage of at least one of the services;

b) determining respective receive data rates at which data is received in response to a request for data by a respective service; and c) for each service, comparing the receive data rate with at least one pre-defined rate value and disabling the first timer when the receive data rate is less than the pre-defined rate value and re-enabling the first timer when the receive data rate exceeds the pre-defined rate.

Preferably, the method includes the step of storing a plurality of pre-defined rate values and associating separate pre-defined rate values with each service.

Preferably, the method includes the step of producing a billing record identifying each service requested by the user, each time value accumulated on each first timer associated with each service requested by the user respectively and a charge amount associated with each service, the charge amount being calculated from rate information associated with each service respectively and the time indicated by the first timers associated with each service respectively.

According to another aspect of the invention, there is provided an apparatus for recording actual time used by a service which makes requests for data, the apparatus including a first timer for recording time during which the service is in operation and a second timer rendered operable when the service requests data. The second timer is operable to disable the first timer to suspend the recording of the time when the second timer acquires a value exceeding a pre-defined value, representing the time during which the service is waiting for data in response to a request for data and the second timer re-enables the first timer when the data is received.

Preferably, the apparatus includes memory for storing rate information relating to a billing for charging a user for the use of the service.

Preferably, the apparatus includes a billing device for producing a billing record identifying the service, the time value accumulated on the first timer and a charge amount associated with the service, the charge amount being calculated from the rate information associated with the service and the time indicated by the first timer.

Preferably, the apparatus includes a plurality of timers associated with respective services for recording times during which a plurality of respective services are in operation and a plurality of second timers. Each of the second timers is rendered operable when its associated service requests data, the second timers being operable to disable the respective first timers to suspend the recording of the time for a service when the second timer associated with the service acquires a value exceeding a pre-defined value, representing the time during which the service is waiting for data in response to a request for data. The second timers are also operable to re-enable the respective first timers when the data is received.

Preferably, the apparatus includes memory for storing a plurality of pre-defined values and associating separate pre-defined values with each service.

Preferably, the apparatus includes memory for storing rate information relating to a billing for charging a user for the use of the service.

Preferably, the apparatus includes a billing device for producing a billing record identifying each service requested by the user, each time value accumulated on each first timer associated with each service requested by the user respectively and a charge amount associated with each service, the charge amount being calculated from rate information associated with the each service respectively and the time indicated by the first timers associated with each service respectively.

According to another aspect of the invention, there is provided an apparatus for recording actual time used by a service. The apparatus includes a first timer for recording time during a period in which the service is in operation and a data rate determiner. The data rate determiner determines rate at which data is received, the data rate determiner being in communication with the first timer for disabling the first timer during periods during which the rate at which data is received is less than a pre-defined rate.

Preferably, the apparatus includes a plurality of first timers for recording times during respective periods in which respective services are in operation and at least one data rate determiner for determining respective data rates at which data is received by each of the services and for disabling the first timers of each service receiving data at a rate less than a pre-defined data rate and for re-enabling the first timers when the data rate exceeds the pre-defined data rate.

Preferably, the apparatus includes memory for storing a plurality of pre-defined rate values, each rate value being associated with a respective service.

Preferably, the apparatus includes a billing device for producing a billing record identifying each service requested by the user, each time value accumulated on each first timer associated with each service requested by the user respectively and a charge amount associated with each service, the charge amount being calculated from rate information associated with the each service respectively and the time indicated by the first timers associated with each service respectively.

According to another aspect of the invention, there is provided a method of recording actual time used by a service, the method comprising the steps of:
a) recording time during a period in which the service is in operation;
b) determining a rate at which data used by the service is received; and
c) disabling the first timer during periods during which the rate at which data is received is less than a pre-defined rate.

Preferably, the method includes the steps of:
a) recording times during respective periods in which respective services are in operation;
b) determining respective data rates at which data is received by each of the services;
c) disabling the first timers of each service receiving data at a rate less than a pre-defined data rate; and
d) re-enabling disabled first timers when the data rate associated with a corresponding service exceeds the pre-defined data rate.

Preferably, the method includes the step of storing a plurality of pre-defined rate values, each rate value being associated with a respective service.

Preferably, the method includes the step of producing a billing record identifying each service requested by the user, each time value accumulated on each first timer associated with each service requested by the user respectively and a charge amount associated with each service, the charge amount being calculated from rate information associated with the each service respectively and the time indicated by the first timers associated with each service respectively.

The apparatus according to the invention allows users to pay for services rendered, using a smart card or electronic purse or a credit card. In addition, the user may pay for a voice call and may also simultaneously pay for a multimedia service such as electronic mail, Internet browsing or a one time purchase from an electronic mall. Effectively, the terminal reacts to user actions by automatically adjusting a smart card debit value or decrementing a certain amount per minute based on the user's specific actions and any associated rates. Thus, a number of services may be used simultaneously by a user, such as speaking on the phone while browsing the Internet and/or purchasing an item. By allowing the user to conveniently pay for these services for a single insertion of a smart card or electronic purse, further usage of services is encouraged.

In addition, the invention integrates payment timers closely with data delivery and suspends payment while the service is in a wait state such as waiting for an abnormally long response from the network or slow delivery of data.

Thus, users are not charged for network outages or slow data transfer rates. By monitoring the response of the network in responding to requests for data and by suspending user payment while a pay phone or service is waiting for the network to respond, users are charged more fairly for services rendered by the terminal.

BRIEF DESCRIPTION OF THE DRAWINGS

FIG. 9 is a schematic representation of a service record according to the first embodiment of the invention;

FIG. 11 is a schematic representation of a service usage record according to the first embodiment of the invention;

FIG. 17 is a flowchart of a card clearing task program according to the first embodiment of the invention; and FIG. 18 is a flowchart of an idle terminal program according to the first embodiment of the invention.

DETAILED DESCRIPTION

FIG. 1

Figure 1:
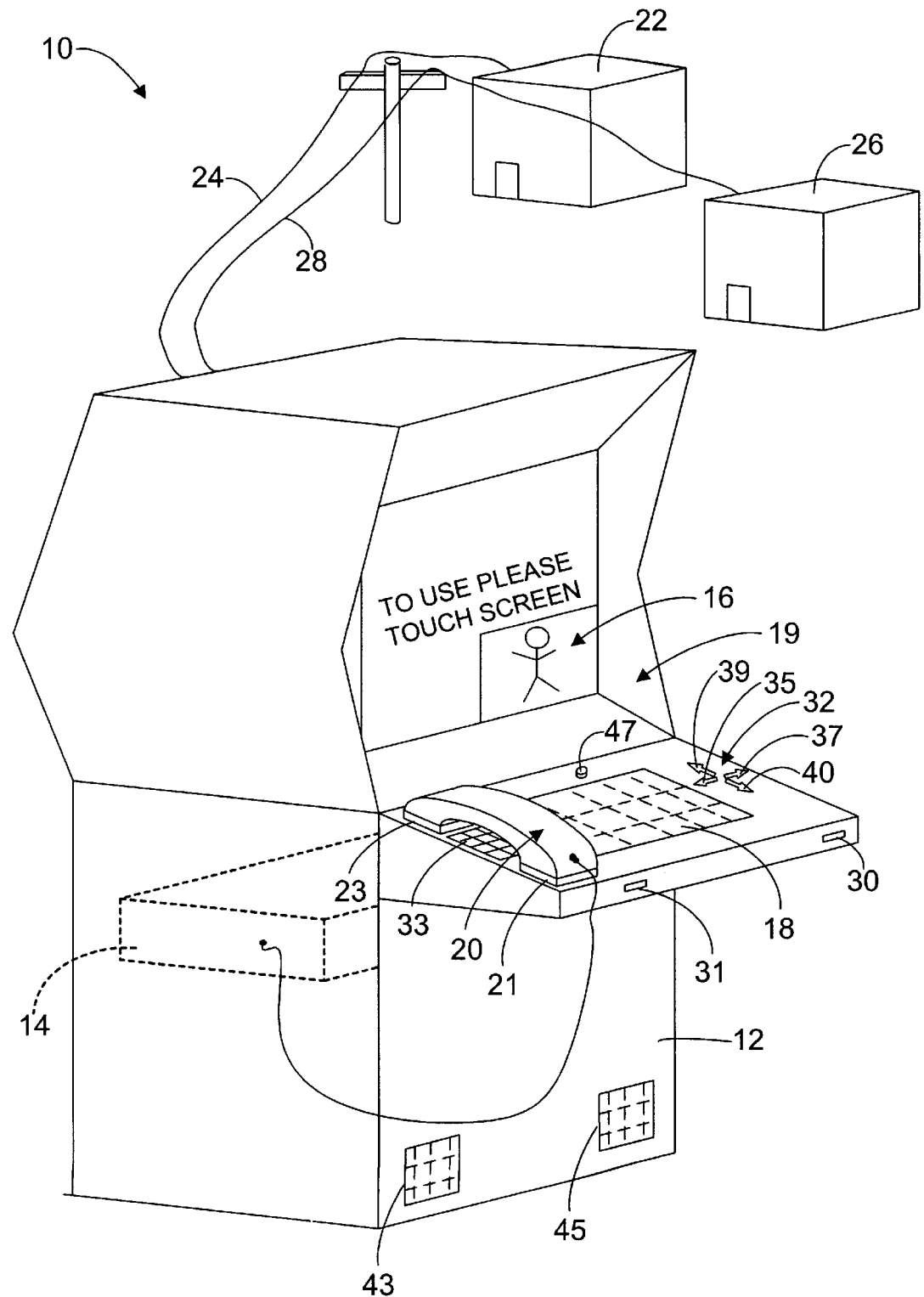
FIG. 1 is a schematic representation of an apparatus according to a first embodiment of the invention.

Referring to FIG. 1, an apparatus for vending public communications services, according to a first embodiment of the invention is shown generally at 10. The apparatus includes a public communications services Kiosk apparatus having a base 12 in which is mounted a computer 14, a display 16 and a keyboard 18, together acting as a multimedia terminal 19. The base 12 also has a telephone mounted thereon, the telephone being shown generally at 20.

The telephone 20 is in communication with a public telephone network 22 via a central office telephone line 24 equipped with an answer supervision feature. The telephone includes a microphone 21 and a telephone receiver 23, the telephone receiver being operable to communicate audio signals to a user.

The computer 14 is connected to a central server 26 by a communications line 28 which may include an Ethernet 10 base T connection.

Also mounted on the base 12 is a credit card reader 30, a printer 31 and a telephone dial pad 33. Also mounted on the base are physical scroll actuators shown generally at 32, which are in communication with the computer 14 for directing the computer 14 to effect functions associated with the display 16. The physical scroll actuators include left, right, up and down actuators 35, 37, 39 and 41 for receiving user input for scrolling information displayed by the display left, right, up and down respectively, line by line or page by page.

Also secured to the base are left and right stereo speakers 43 and 45 for communicating audio signals to a user, in connection with multimedia services provided at the multimedia terminal. A common volume control 47 common to the telephone receiver 23 and the speakers 43 and 45 includes first and second actuator buttons mounted on the base 12 for selectively controlling the volume of signals produced by the telephone receiver 23 or the speakers 43 and 45, depending upon which of the telephone and multimedia terminal 19 is in use by a user.

The keyboard has semi-transparent keys and a low power light source mounted thereunder selectively operable to be turned on and off.

Generally, the computer 14 controls all operations of components mounted on the base 12, including the telephone 20 and multimedia terminal 19.

FIG. 2

Figure 2:
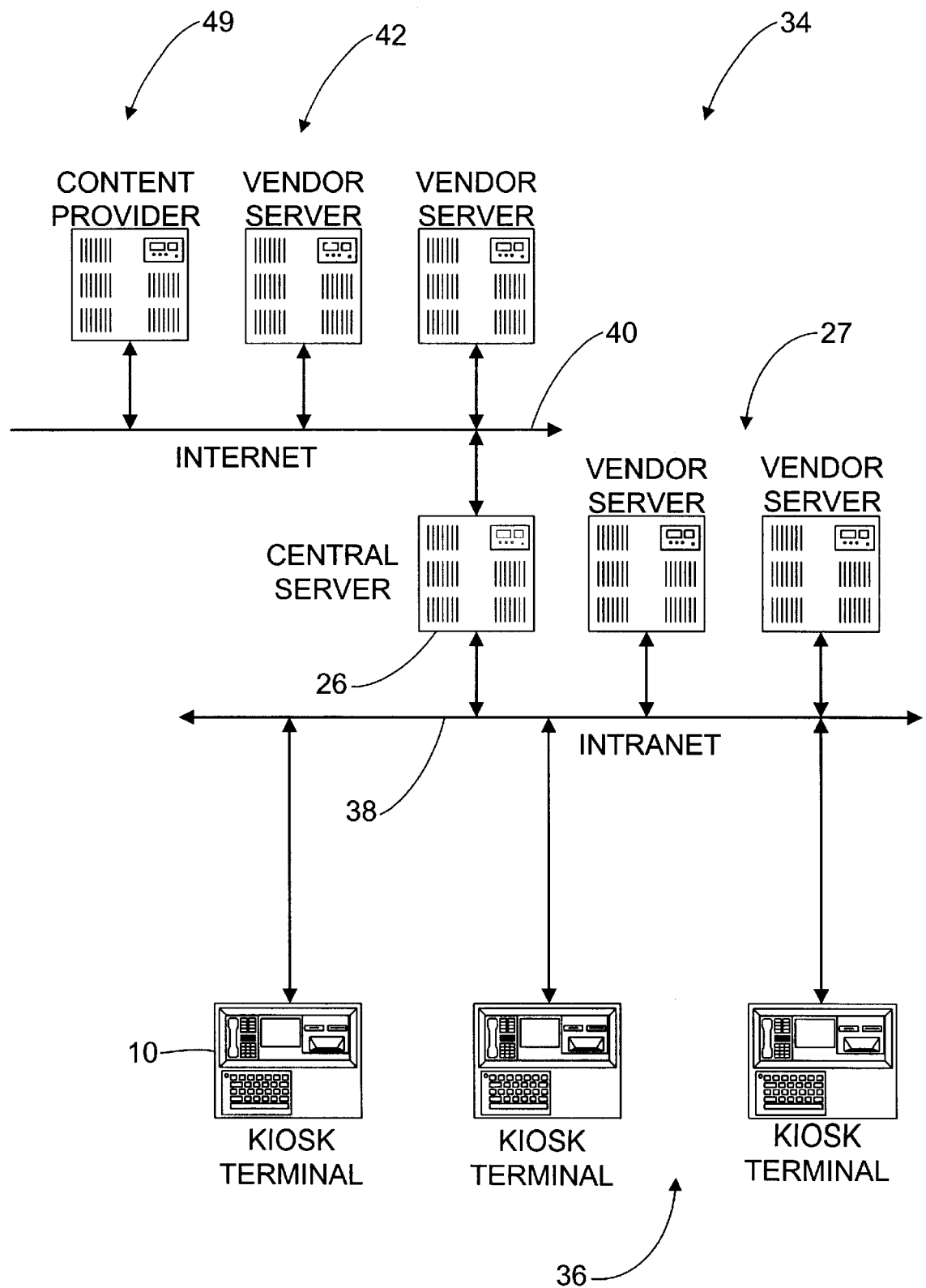
FIG. 2 is a schematic diagram of a network to which the apparatus of FIG. 1 is connected.

Referring to FIG. 2, a schematic diagram of the connection of the computer 14, shown in FIG. 1 to the central server 26 is shown generally at 34.

In this embodiment, the public communications services Kiosk apparatus 10 is one of a plurality 36 of kiosk apparatus connected to an intranet 38 private network on the communications line 28 in communication with the central server 26. A plurality 27 of vendor servers are also connected to the intranet 38, for communication with the central server 26. The central server 26 is further in communication with the Internet 40 to which a plurality of further vendor servers 42 and content providers 49 are connected. Thus, the vendor servers 27 are in communication with the central server 26, and the central server 26 is in communication with the kiosk apparatus 36.

FIG. 3

Figure 3:
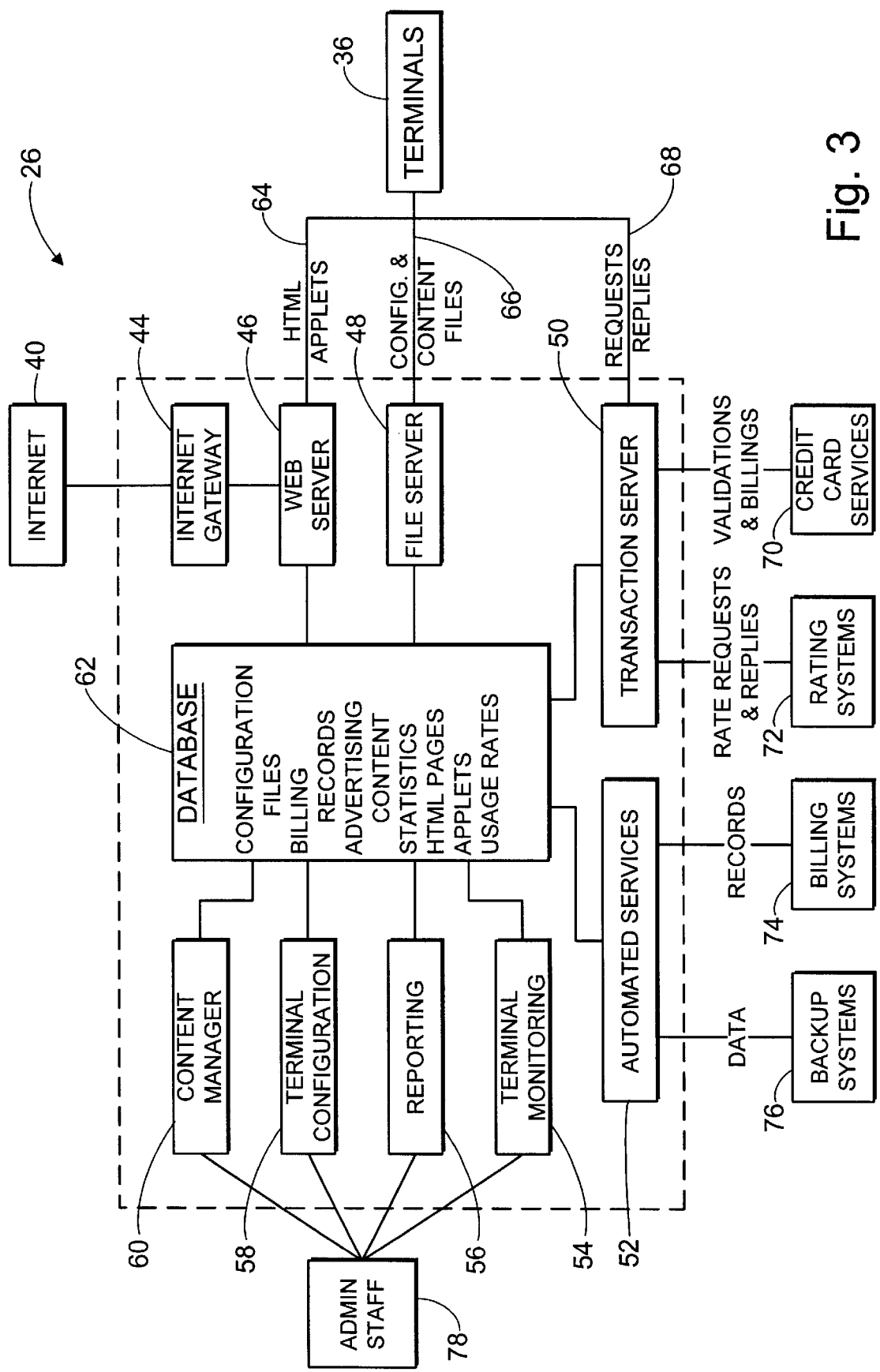
FIG. 3 is a block diagram of a central server according to the first embodiment of the invention.

Referring to FIG. 3, a block diagram of the central server is shown generally at 26. The central server includes an internet gateway interface 44, a web server interface 46, a file server interface 48, a transaction server interface 50, an automated services interface 52, a terminal monitoring interface 54, a reporting interface 56, a terminal configuration interface 58, a content manager interface 60 and a database 62.

The internet gateway interface 44 provides a high speed dedicated high bandwidth connection such as a T1 connection to the Internet 40, for receiving HTML pages or at least one multimedia file from an Internet provider and for providing uniform resource locators (URLs) to vendor servers (42) and content providers (43) connected to the Internet 40.

The Internet gateway interface 44 is also in communication with the web server interface 46 which is in communication with the database 62 and is in communication with the kiosk terminals 36 by way of an HTML/applet pipe 64. The web server interface 46 is thus able to transmit HTML pages and applet programs to the kiosk apparatus 36 by way of the HTML/applet pipe 64. In addition, the web server interface 46 is operable to provide content files from the database 62 to the Kiosk apparatus 36 through the HTML/ applet pipe 64. Effectively, the web server determines the type of content requested by a apparatus and extracts the requested files from the database 62 or the Internet 40 and transmits the requested files to the public communications services Kiosk apparatus.

The file server interface 48 is also in communication with the database 62 and with Kiosk apparatus 36. Communication with the apparatus is conducted by way of a configuration and content file pipe 66 by way of which configuration and content files obtained from the database 62 are transmitted by the file server interface 48 to the kiosk apparatus 36.

The transaction server interface 50 is further in communication with the database 62 and with the kiosk apparatus 36. Communication between the transaction server and the kiosk apparatus 36 is provided by a request/reply pipe 68. The transaction server is thus able to receive request messages from the kiosk apparatus 36, interpret such requests, and transmit suitable replies on the request/reply pipe 68. The transaction server is further in communication with a credit card service 70 such as Bank of Montreal and is further in communication with at least one rating system 72 which, in this embodiment, includes MORRIS (trademark) offered by Bell-Canada. The transaction server interface 50 communicates with the credit card service 70 by transferring validations and billings. Validations include requests from the transaction server interface 50 for card validation to authorize charges to appear on a card and include the transfer of billing information, such as amounts and card numbers to which charges are to be applied by the credit card service 70.

The transaction server interface 50 also communicates with the credit card service to store files in the data base, relating to local card clearing information. The transaction server interface 50 communicates rate requests and receives replies from the rating system 72, in relation to telephone billing rates, commercial services rates, etc. Rate requests are made by the transaction server to the rating system 72 and the rating system 72 replies with the requested rates. Such rates are then provided to the kiosk apparatus 36 by way of the request reply pipe 68.

The automated services interface 52 is in communication with the database 62, a billing system 74 and a backup system 76. The automated services interface 52 provides billing records to the database 62 and to off-premises billing systems 74 and further provides data relating to the contents of the database 62 to backup systems 76.

The terminal monitoring interface 54, reporting interface 56, terminal configuration interface 58 and content manager interface 60 are all in communication with an administrative staff terminal 78 which administrative staff use to configure the central server 26 and monitor its functions. The terminal monitoring interface 54 effectively provides to the administrative staff terminal 78 a typical control room interface and maintains a monitor of alarms associated with various functions of the central server, for example, loss of communication to any one of the kiosk apparatus 36. The terminal monitoring interface 54 maintains an alarm table in the data base 62.

The reporting interface 56 monitors transactions between the central server and the database to accumulate statistics regarding the amount of money made by each kiosk apparatus 36 and the number of times particular services are used etc. The reporting interface 56 thus stores statistical files and usage rate files in the data base 62.

The terminal configuration interface 58 is used to receive operational information from operators, such as timeout numbers screen information, etc., serial number of units, service records including service identifications, service types and service rates etc. and stores such information in the database 62 as configuration files which identify how a apparatus is to be configured to present multimedia services to a user.

The content manager interface 60 receives advertising and information regarding user interface buttons, from the administrative staff terminal 78. The content manager interface 60 stores such information as advertising content files, HTML pages and applets in the database 62.

The database 62 thus includes configuration files for is configuring apparatus 36 to present multimedia services to a user, billing records, advertising or multimedia content files for providing multimedia content to the apparatus, statistical information relating to services rendered, HTML pages and multimedia files received from an Internet provider for use at the apparatus, applets for execution at the apparatus, usage rates, an alarm table, and local credit card information for validating credit cards used at the apparatus.

Each of the interfaces of the central server 26 includes respective program steps for directing a computer within the central server to perform the indicated interface functions.

The central server may be formed as a single computer or may be formed over a distributed network. In general, such a single computer or distributed network acts as a transmitter for transmitting for receipt by at least one public communications services Kiosk apparatus 36, over a private network, a multimedia configuration file for configuring the apparatus to present multimedia services to a user. Such transmitter also transmits multimedia content files of actual multimedia content available to users at the public communications services Kiosk apparatus.

FIG. 4

Figure 4:
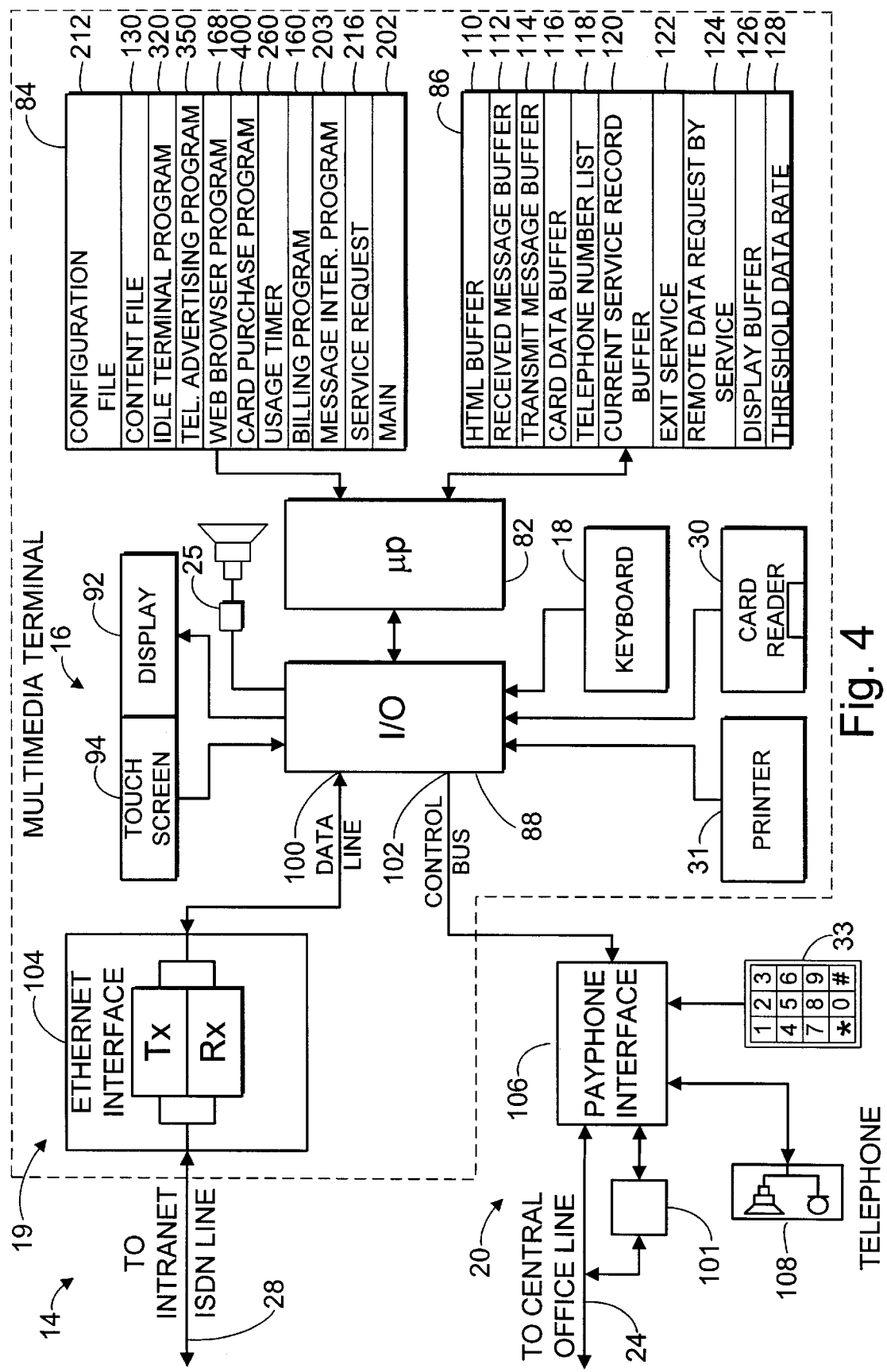
FIG. 4 is a block diagram of an electronic circuit according to a first embodiment of the apparatus.

Referring to FIG. 4, a block diagram of the kiosk apparatus computer 14 is shown. The kiosk apparatus effectively includes a multimedia terminal 19 and a telephone 20.

The multimedia terminal portion includes a microprocessor 82 in communication with non-volatile memory 84, volatile memory 86 and an I/O port 88. The I/O port is in communication with display 16 which includes a video display 92 and a touchscreen 94, each individually in communication with the I/O port 88. In this embodiment, the display and touchscreen are integrated into a single unit approximately 10 to 12 inches diagonal and has an adjustable viewing cone for public and private usage applications.

The I/O port is further in communication with the card reader 30, the printer 31, the keyboard 18 and a speaker driver 25 for driving the speakers 43 and 45. The I/O port also has first and second communications ports 100 and 102, the first communications port 100 being connected to an Ethernet interface 104 which is connected to the intranet via a high speed connection such as an ISDN line and is operable to signal to the microprocessor through the I/O port an indication of whether or not a message has been received and whether or not a complete transmission of a file has been received.

The second communications port 102 is connected to a pay phone interface which is connected to the central office line 24. Also, connected to the pay phone interface, are the telephone dial pad 33 and a handset 108 on which is mounted the microphone 21 and receiver 23.

In effect, the microprocessor 82 is in communication with the display 16, the card reader 30, the printer 31, the keyboard 18 and the speaker driver 25, the Ethernet interface 104 and the pay phone interface 106 via the I/O port 88. The keyboard has transparent keys and a light adjacent the keys for selectively lighting the keys to indicate a user response is to be entered at the keys. After a user response has been entered, the light is turned off. The light is controlled by any application program running at the apparatus.

The pay phone interface is operable to pick up and drop the central office line and includes a sensor 101 to indicate to the second communications port 102, whether or not the central office line is in use by the pay phone interface 106.

The volatile memory 86 is organized by the microprocessor 82 to include a plurality of buffers including:

an HTML buffer 110, a received message buffer 112, a transmit message buffer 114, a card data buffer 116, a telephone number list 118, a current service record buffer 120, an exit service buffer 122, a remote data request by service buffer 124, a display buffer 126 and a threshold data rate buffer 128. The non-volatile memory 84 is organized by the microprocessor 82 to include a plurality of buffers for storing a configuration file 212, a content file 130, an idle terminal program 320, a telephone advertising program 350, a web browser program 168, a card purchase program 400, a usage timer 260, a billing program 160, a message interpretation program 203, a service request program 216 and a main program 202.

FIG. 5

Figure 5:
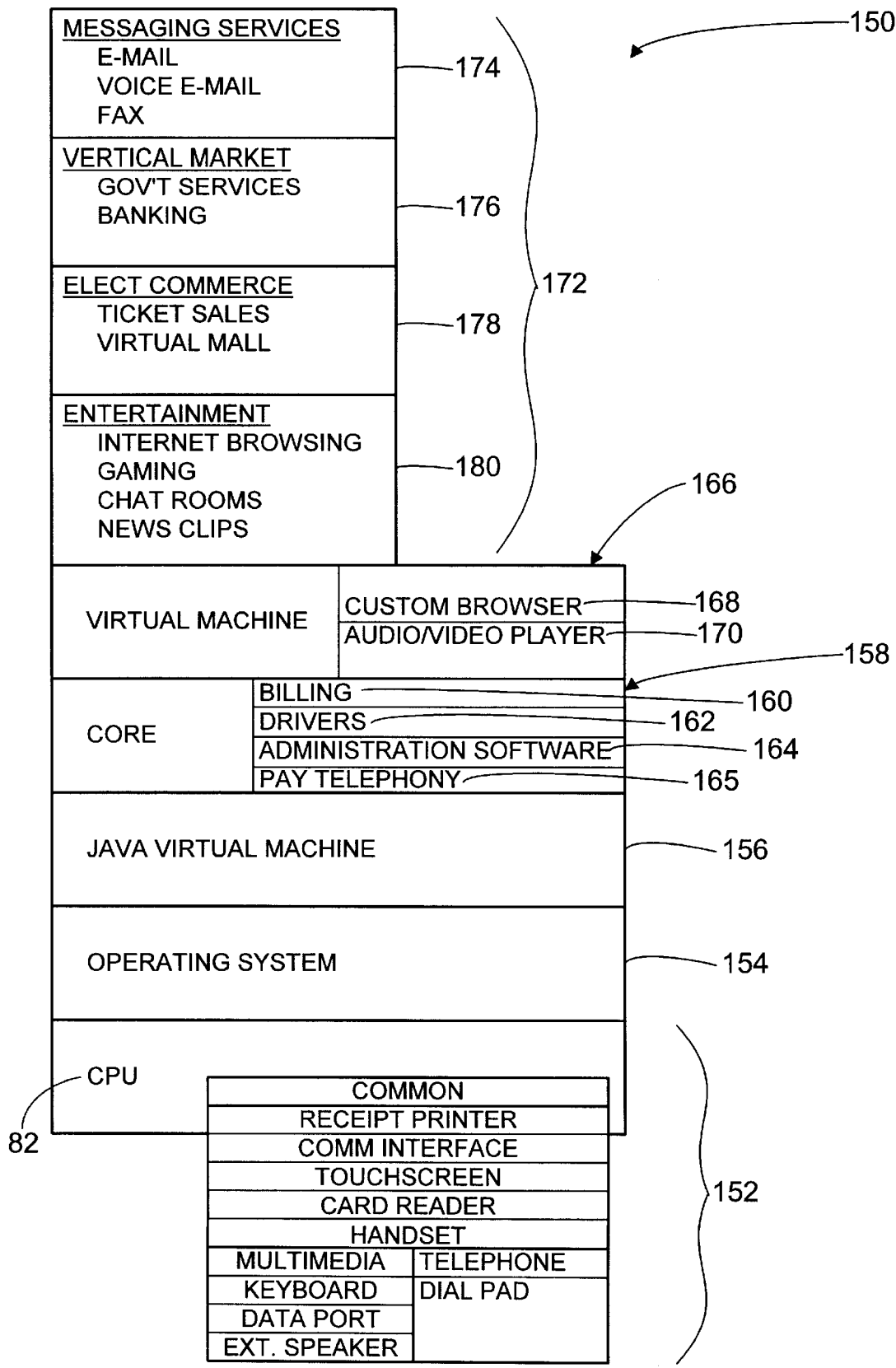
FIG. 5 is a schematic diagram of a computer architecture employed in the apparatus according to the first embodiment of the invention.

Referring to FIG. 5, the architecture of the multimedia apparatus is shown generally at 150. The architecture includes the components shown in FIG. 4 in a hardware layer 152 thereof.

The architecture further includes an operating system 154. The operating system in this embodiment, is of the type provided by Microware, known as OS/9 (trademark). The properties of this operating systems are that it has high recoverability, it is suitable for real time operation, it has compatibility with the indicated hardware devices, it has built-in fault recovery, and it is well supported by the microprocessor. In addition, this operating system is licensed to interact with the JAVA (trademark) programming language.

The architecture further includes a JAVA virtual machine 156 which allows programs to run without recompiling. JAVA also provides an easy high level interface and has a convenient class library which gives programmers a convenient application programmatic interface (API) set.

The architecture further includes a core program layer 158 including billing programs 160, hardware drivers 162 and administration software 164, and pay telephony programs 165.

The core program base looks after such features as maintenance such as notifying the central server of a time to load more paper into the printer, provides a user interface, manages network connectivity and download features for downloading files from the central server and for providing pay phone functionality.

The architecture 150 further includes a virtual machine 166 which includes a custom web browser 168 and an audio video player 170. The custom web browser 168 provides an interface between the user and the multimedia terminal and the audio video player provides visual images on the display 16 and audio/sound bytes on the speakers for advertising, for example.

The architecture further includes an application layer shown generally at 172 including a messaging services application 174, a vertical market application 176, an electronic commerce application 178 and an entertainment application 180. The messaging services application 174 includes features such as e-mail, voice e-mail and fax. The vertical market application 176 includes government services and banking. The electronic commerce application 178 includes ticket sales and virtual mall displays. The entertainment application 180 includes Internet browsing capabilities, gaming, chat rooms and newsclips.

FIG. 6

Figure 6:
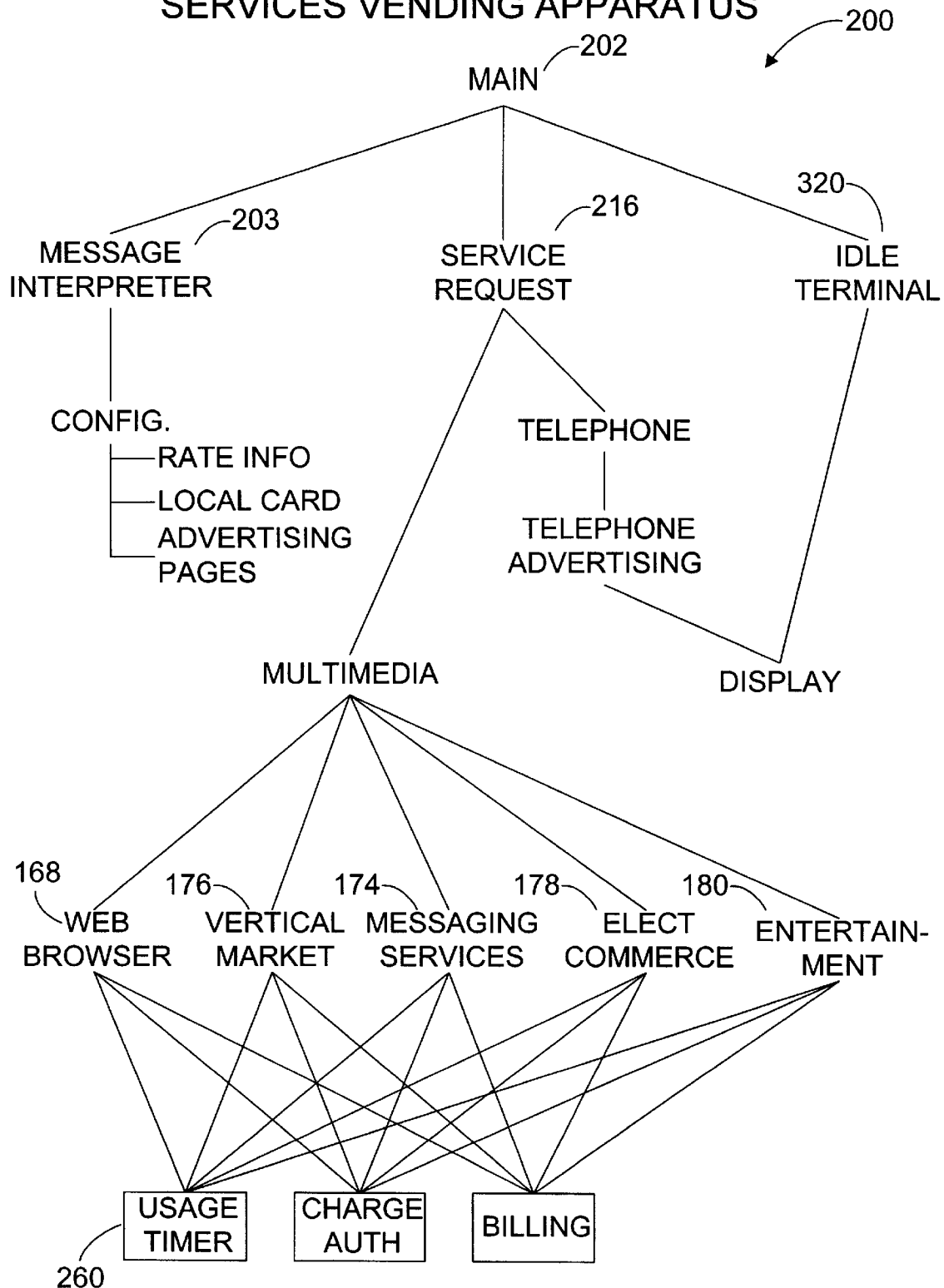
FIG. 6 is a schematic representation of programs in the apparatus according to the first embodiment of the invention.

Referring to FIG. 6, a chart of high level programs stored in the non-volatile memory 84 is shown generally at 200. Each of the programs listed in the chart is associated with the core program layer 158 shown in FIG. 5, with the exception of the custom web browser 168 which is associated with the virtual machine 166 of FIG. 5, and the vertical market 176, messaging services 174, electronic commerce 178 and entertainment 180 applications modules shown in FIG. 5.

The programs include a main program 202 which the apparatus runs in the background. In response to an interrupt received at the first communications port 100 in FIG. 4, a message interpreter program 203 is invoked.

FIG. 7

Message Interpreter

Figure 7:
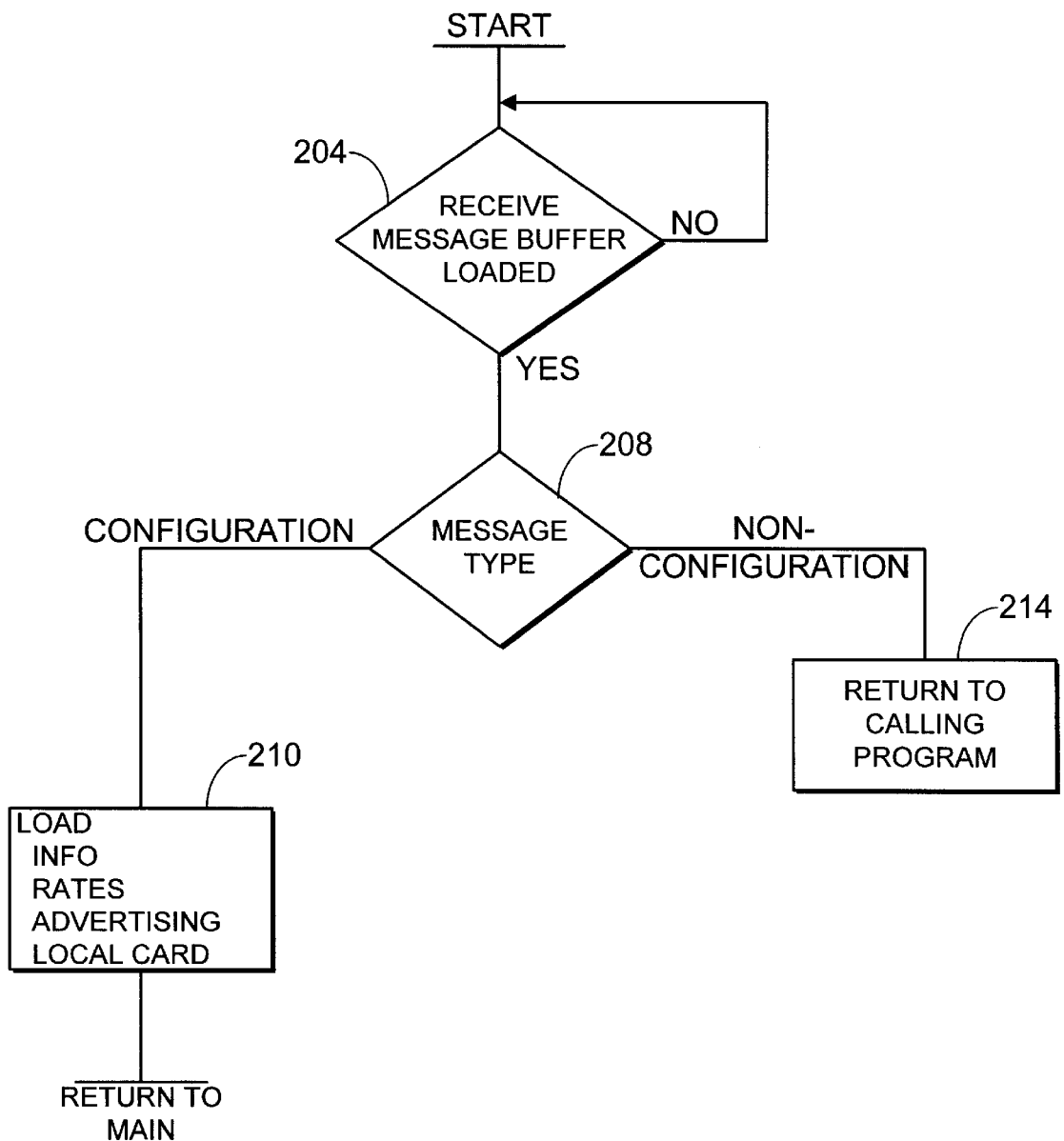
FIG. 7 is a flowchart of a message interpreter according to the first embodiment of the invention.

Referring to FIG. 7, the message interpreter 203 includes a block 204 which directs the microprocessor 82 shown in FIG. 4 to read the I/O port 88 to determine whether or not the receive message buffer 112 is loaded. If not, the microprocessor is directed to continue to test the I/O port 88 to determine when the buffer is loaded. If the buffer is not loaded within a timeout period, the microprocessor 82 is returned to the main program 202 shown in FIG. 6.

Referring back to FIG. 7, if the receive message buffer is loaded, block 208 directs the microprocessor 82 to determine the type of message received. If the message is of a configuration type, it indicates that a configuration file has been downloaded from the central server. The configuration file includes information relating to rates, advertising, content, and local card clearing information. Block 210 directs the processor to load this information into non-volatile memory 84 shown in FIG. 4. Thus, a configuration file 212 is stored in the non-volatile memory 84.

Upon completion of storing the configuration file, the microprocessor 82 is returned to the main program 202 shown in FIG. 6.

Referring back to FIG. 7, if the message type read by the microprocessor 82 at block 208 is of the non-configuration type, block 214 directs the microprocessor 82 to return to the calling program, which in this embodiment, is the main program 202.

Service Selection

Figure 8:
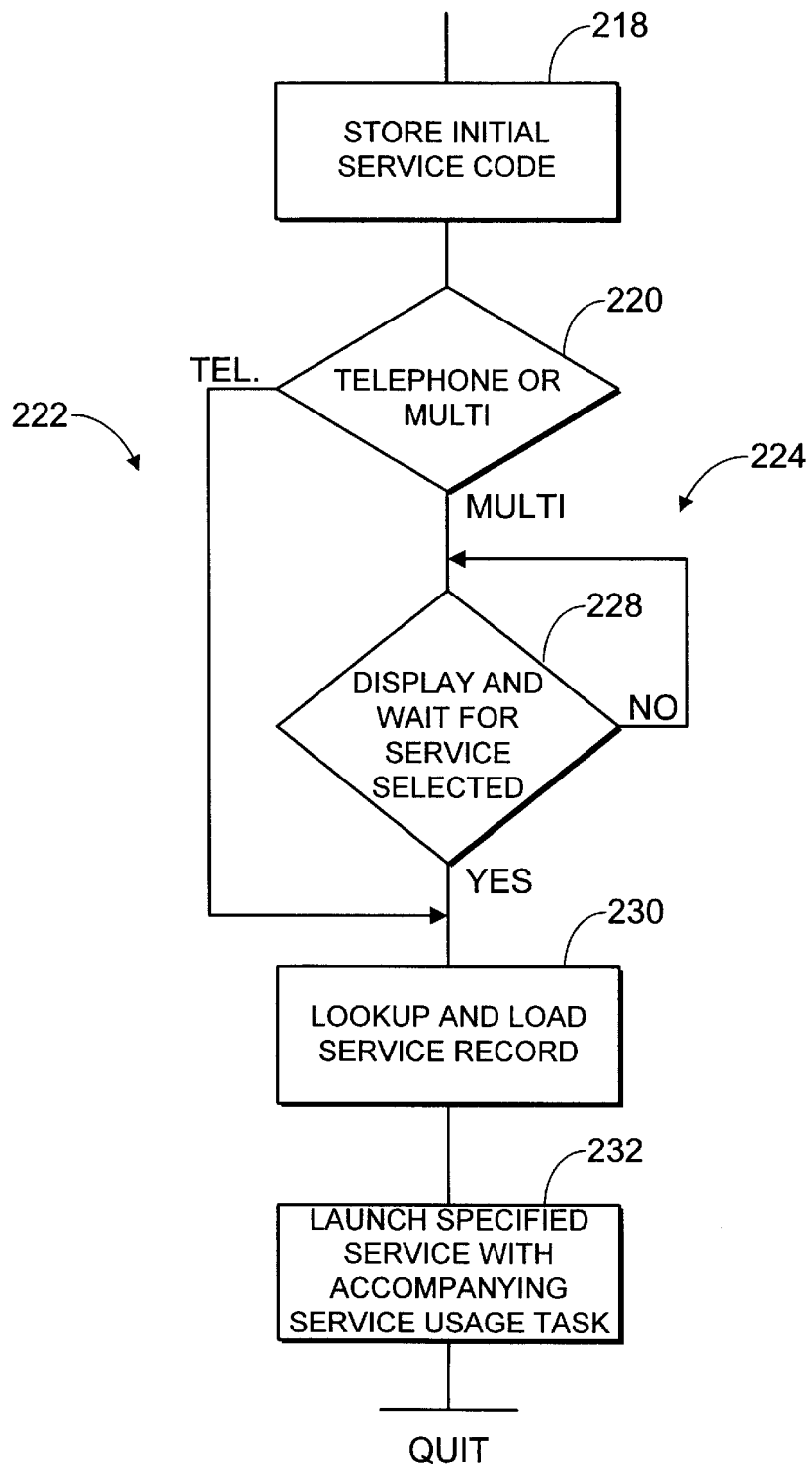
FIG. 8 is a flowchart of a service request program according to the first embodiment of the invention.

Referring back to FIG. 6, if a user makes a service request, to use either a multimedia service or a telephone service offered by the apparatus, a service request program 216, shown in FIG. 8 is invoked. A service request for use of the pay telephone is provided by a user by simply lifting the handset 108 shown in FIG. 4, whereupon the sensor 101 detects connection to the central office line and provides a signal over the second communications port 102 to the I/O port to indicate to the microprocessor 82 that a request to use the telephone has been made.

On the other hand, pressing any key on the keyboard will be interpreted by the microprocessor 82 as a request for multimedia services.

Referring to FIG. 8, upon selection of a service by a user, a code indicating the type of service, telephone or multimedia, is produced, depending upon the state of the handset and whether or not a key on the keyboard has been actuated. Block 218 directs the processor to store this code as a type code to indicate whether telephone services or multimedia services have been requested. Block 220 then directs the microprocessor 82 to a telephone branch 222 or to a multimedia branch 224 specified by the service type code stored at block 218.

If the user has requested a multimedia service, block 228 directs the microprocessor to cause to be displayed on the display 92, a menu of available multimedia services and to wait for a user selection of a desired service. The user does this by pressing on the touch screen 94 whereupon a message indicating the area of the touch screen touched, is provided to the microprocessor. The microprocessor interprets the message as an indication of the user's selection and on reference to a lookup table (not shown), an identification code for the selected service is obtained. The microprocessor 82 then augments the initial code previously stored in connection with the service request program (at Block 218 in FIG. 8) to produce a service identification code to indicate the specific multimedia service requested. If the user had selected to use the telephone, a service identification code associated with the telephone service is produced. Thus, a service identification code is produced to indicate the type of service requested by the user.

Block 230 then uses the service identification code to lookup a service record stored in non-volatile memory, FIG. 9

Service record

Referring to FIG. 9, a service record 231 includes a service identification field 233, a service type field 235 and a service rate field 237. The contents of these fields are provided from the configuration file received from the central server. Generally, the service record relates service identifications with service types and associated service rates. The service record associated with the service identification specified by the user is retrieved from memory and stored in a current service record buffer in volatile memory.

Referring back to FIG. 8, block 232 directs the microprocessor 82 to launch the service specified by the contents of the service identification field 233 and at the same time to launch a corresponding service usage task associated with the requested service.

To launch one of the multimedia services, a web browser application, virtual market interface application, messaging service application or electronic commerce application is loaded and run, depending upon the service requested by the user. Alternatively, if the user has requested telephone service, a telephone application is launched. It will be appreciated that more than one application can be launched at a time and, therefore, it is possible for the user to simultaneously use telephone services and multimedia services at the same time.

Figure 10:
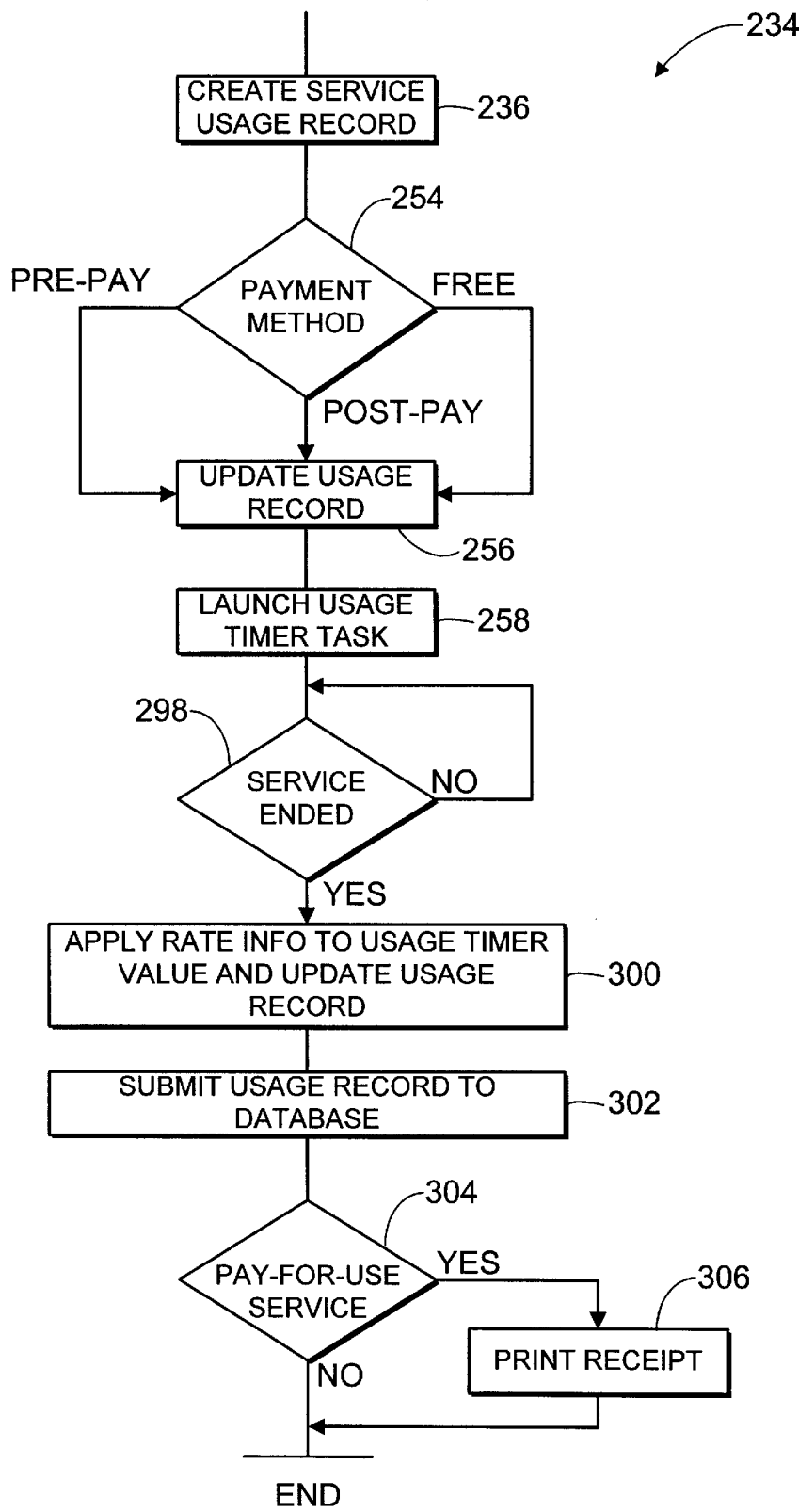
FIG. 10 is a flowchart of a service usage request program according to the first embodiment of the invention.

FIGS. 10 and 11

Referring to FIG. 10, the corresponding service usage task begins with block 236 which directs the processor to produce a service usage record as shown in FIG. 11. The service usage record includes a transaction identification field 240, a service identification field 242, a date/time field 244, a duration field 246, a charge field 248, a payment method field 250 and a card number field 252. Initially, the contents of each of these fields is zero, however, after the blank record has been created, the transaction identification field is loaded with a unique reference number to uniquely identify the transaction, the service identification field is loaded with the service identification of the service record shown in FIG. 9, the date and time field 244 is loaded with the date and time of the current transaction, and the duration, charge payment method and card number fields 246–252 are left blank.

Referring back to FIG. 10, block 254 directs the processor to present a prompt on the display 92 to request the user to indicate the preferred payment method, if applicable. The use of some services may be free and, if so, the payment method block 254 will receive a code from the launched service indicating that such service is free. In this event, the service usage record 238 is unchanged at this point. If, on the other hand, the user inserts a credit card, the card reader presents to the microprocessor a code indicating that a credit card has been inserted in which case, the payment method is selected as post-pay. Alternatively, if the user inserts a debit-type card, a code indicating a pre-payment method is presented by the card reader to the microprocessor such that at block 254, the microprocessor interprets the preferred method of payment as pre-pay.

Block 256 directs the processor to update the usage record. For example, referring to FIG. 11, in the case where the user has selected the post-pay payment method, card number information relating to the card to which charges are to be applied is stored in the card number field 252 and the payment method field 250 is loaded with a code indicating post-payment method. The duration and charge fields 246 and 248 are left blank.

Referring to FIG. 10, block 258 then directs the processor to launch a usage timer task associated with the service.

FIG. 12

Figure 12:
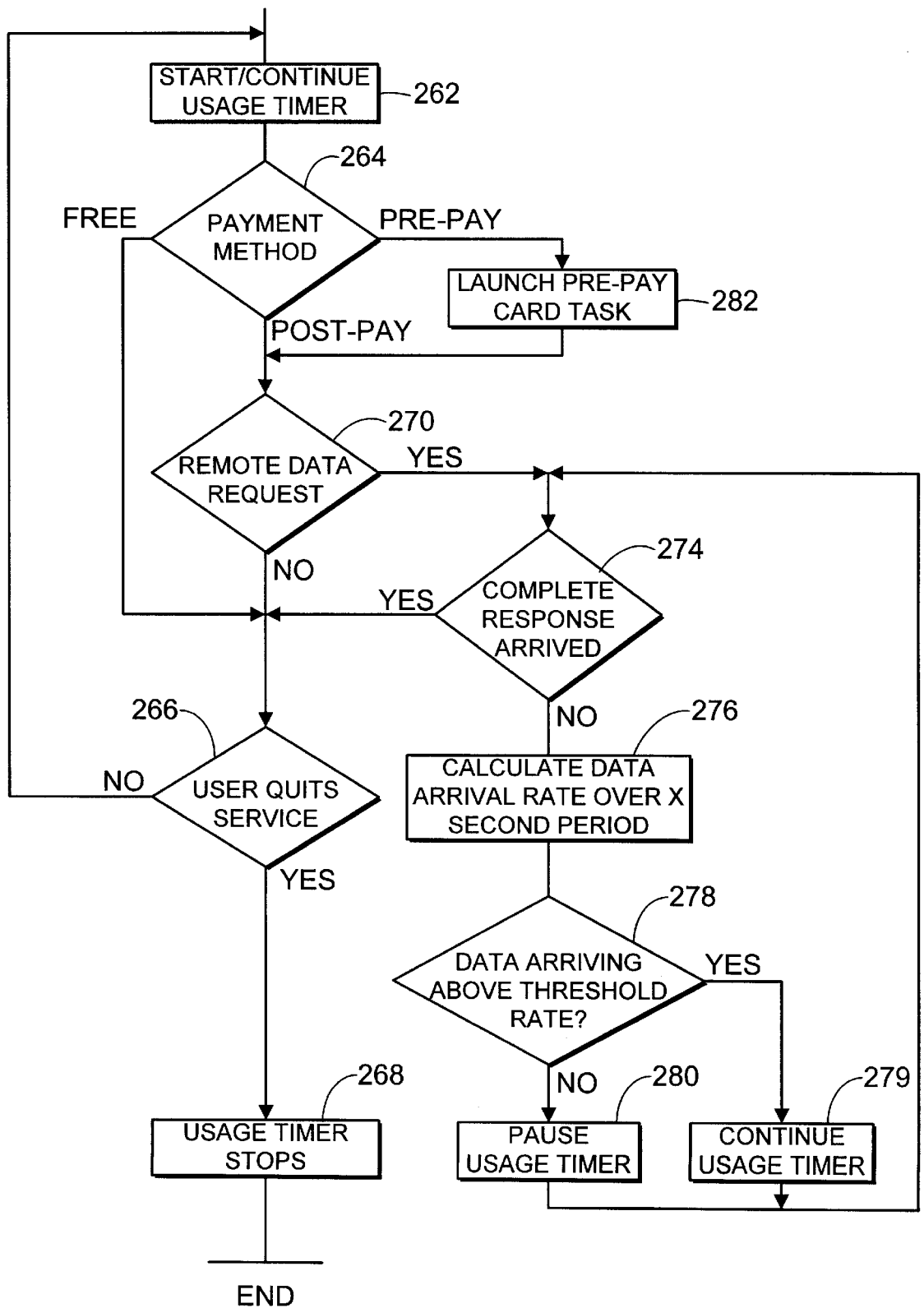
FIG. 12 is a flowchart of a usage timer task program according to the first embodiment of the invention.

Referring to FIG. 12, the usage timer task is shown generally at 260 in FIG. 12 and begins with a first block 262 which directs the processor to start a timer for cumulatively recording the time during which the corresponding service is in operation. Thus, there is a first timer which is enable in response to a request for access to at least one multimedia service at the public communications service vending apparatus. In this embodiment, the timer counts seconds.

It should be noted that a usage timer task is launched in association with each service requested by the user. Therefore, there are a plurality of timers associated with the multimedia services respectively, for simultaneously cumulatively recording times during which respective multimedia services are in operation and furthermore, such timers are enabled in response to respective requests for access to respective services.

Block 264 then directs the processor to determine which payment method has been selected by the user and if the free payment method has been selected, the processor is directed to block 266 which determines whether or not the user has pressed an exit button on the touchscreen indicating the service is to be ended. If so, block 268 directs the usage timer to stop and the usage timer task is ended. If the user has not quit the service, as detected at block 266, the processor is directed back to block 262 which continues the operation of the usage timer and the above process is repeated.

If the user has requested the post-payment method, block 270 directs the processor to determine whether or not the service has requested data from the remote server. If it has not, blocks 262, 264, and 270 are repeated until data is requested.

When data is requested, block 274 directs the microprocessor 82 to read the first communications port 100 to determine whether or not a complete response has been received. It will be appreciated that the data request may require the transfer from the central server to the apparatus of a rather large file which may take some time to receive.

If a complete response has been received, blocks 266, 262, 264, 270, and 274 are repeated until a situation exists where a request for data has been sent to the remote service, but a complete response has not yet been received. In this situation, block 276 directs the processor to determine a data receive rate at which data is received by observing the number of blocks of data received each second. The processor thus acts as a data receive rate measurement device.

After calculating the data receive rate, block 278 directs the processor to compare the receive data rate with a predefined threshold rate stored in non-volatile memory. If the data receive rate is at or above the predefined threshold rate, the processor is directed to block 279 where the usage timer is re-enabled if it had been previously disabled or is simply left running if it already was running. The processor is then directed back to block 274, whereupon the receive data rate is continually determined and tested against the threshold rate unless the data arrives at a rate below the threshold rate in which case block 280 directs the processor to disable the usage timer started at block 262, but maintain its current value and to return to block 274 which again calculates the data arrival rate and compares it against the threshold rate, etc. Thus, the effect of blocks 274–280 is to disable or pause the usage timer when data is received at a rate less than the predefined threshold data rate value and to re-enable or maintain the operation of the usage timer when data arrives at or above, that is exceeds the predefined threshold rate, until the complete response has been received.

Thus, the usage time cumulatively records the time during which the associated multimedia service is in operation and maintains the recording of such time while data is received at the apparatus at a rate within a first range ie., above the threshold rate and suspends the recording of time associated with the service when data is received at a rate within a second range, ie., below the threshold rate.

If at block 264, the processor determines that the payment method was a pre-pay method, block 282 directs the processor to launch a pre-pay card task.

FIG. 13

Figure 13:
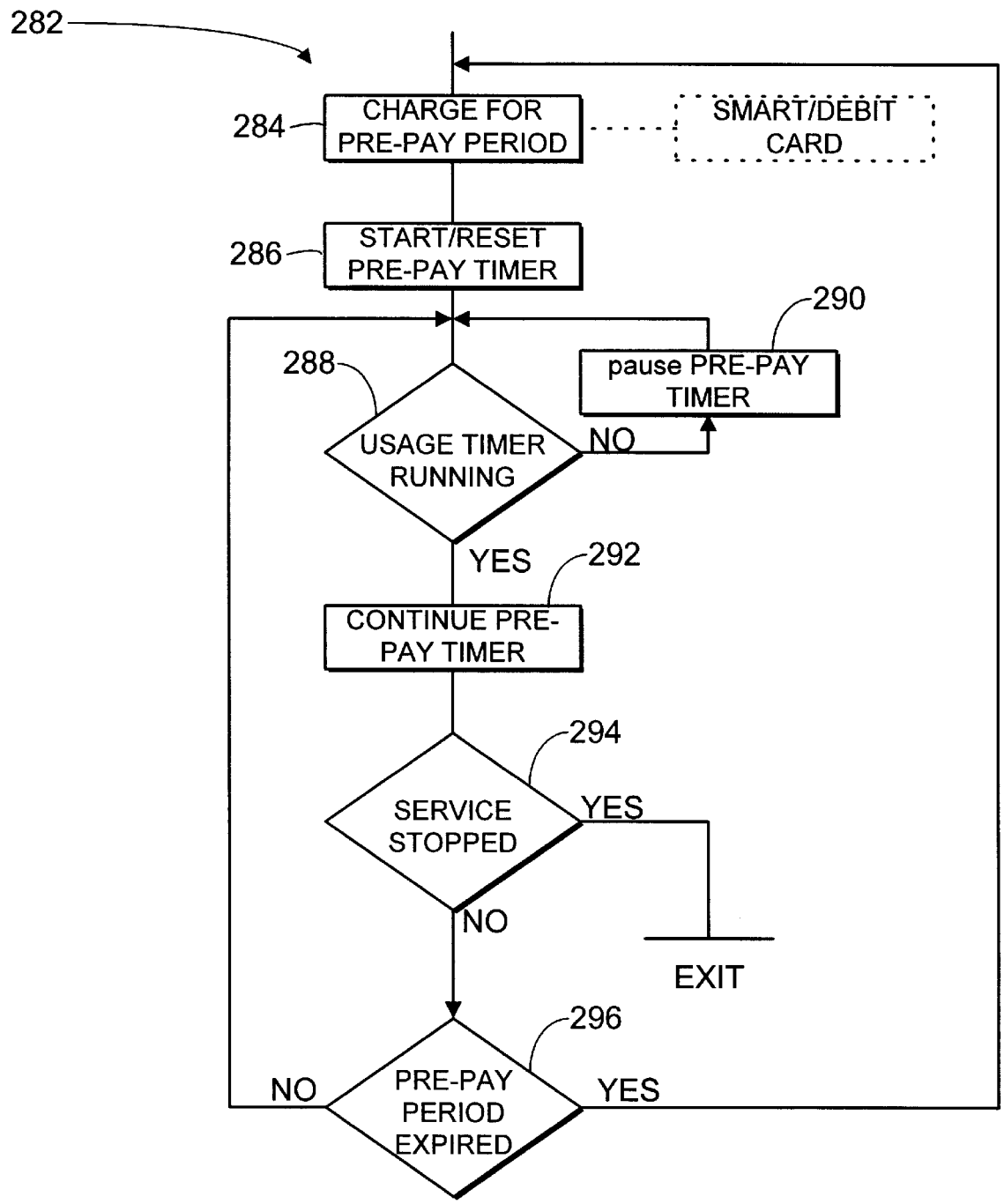
FIG. 13 is a flowchart of a pre-pay card task according to the first embodiment of the invention.

Referring to FIG. 13, the pre-pay card task is shown generally at 282. This task begins with Block 284 which directs the processor to debit the user's debit card by a predetermined amount corresponding to a pre-pay time increment, which, in this embodiment, is one minute.

Block 286 then directs the processor to start or reset a pre-pay timer implemented by the processor. The pre-pay timer is operable to calculate time in minutes.

Block 288 then directs the processor to determine whether or not the usage timer to which reference was made in FIG. 12 at block 262, is running.

If the usage timer is not running, block 290 directs the processor to disable or pause the pre-pay timer. The prepay card task then is maintained in a loop comprised of blocks 288 and 290 until the usage timer (of FIG. 12) is re-enabled. When the usage timer is re-enabled, block 292 directs the processor to re-enable the pre-pay timer. Block 294 then directs the processor to determine whether or not the user has requested to exit the service and if so, the pre-pay card task is exited.

If the user has not requested to exit the service, block 296 directs the processor to determine whether or not the pre-pay period has expired. If the pre-pay period has not expired, the processor is directed back to block 288 and the above steps beginning at block 288 are repeated.

If on the other hand at block 296, the pre-pay period has expired, the processor is returned to block 284 which again debits the user's smart card by a predefined amount corresponding to the pre-paid time increment.

Referring back to FIG. 10, after launching the usage timer task and the pre-pay card task, if necessary, block 298 directs the processor to determine whether or not the service has ended. If the service has ended, block 300 directs the processor to apply the service rate stored in the service rate field 237 of the service record 231 shown in FIG. 9, to the usage timer value stored in the duration field 246 of the service usage record shown in FIG. 11, to calculate the contents of the charge field 248. If the service has not ended, block 298 directs the processor to continue to wait until it has ended.

The processor is then directed to block 302 which directs the processor to submit the service usage record 238 to the central server by transmitting it on the intranet. The processor is then directed to block 304 which directs the processor to determine whether or not the user has requested the pre-payment or post-payment method in which case the processor is directed to block 306 which causes the microprocessor 82 to print a receipt at the receipt printer 31. If the user has requested a free service, the service usage task is ended.

The service usage task, therefore also, acts as a billing program operable to direct the processor to identify each service requested by the user and a charge amount associated with each service, the charge amount being calculated from rate information associated with the service and the time indicated by the first timer associated with the service, More generally, the service usage task program acts as a billing program for directing the microprocessor to produce a bill for services rendered by the multimedia terminal and for usage of the telephone.

It will be appreciated that at block 302, on submission of the usage record to the data base at the central server, the statistical files in the database may be updated to reflect usage of the service.

Referring back to FIG. 8, if at block 220 the microprocessor 82 determines that the user had requested use of the telephone, blocks 230 and 232 are executed as described above, only instead of a multimedia service being launched, a telephone service program is launched.

FIG. 14

Figure 14:
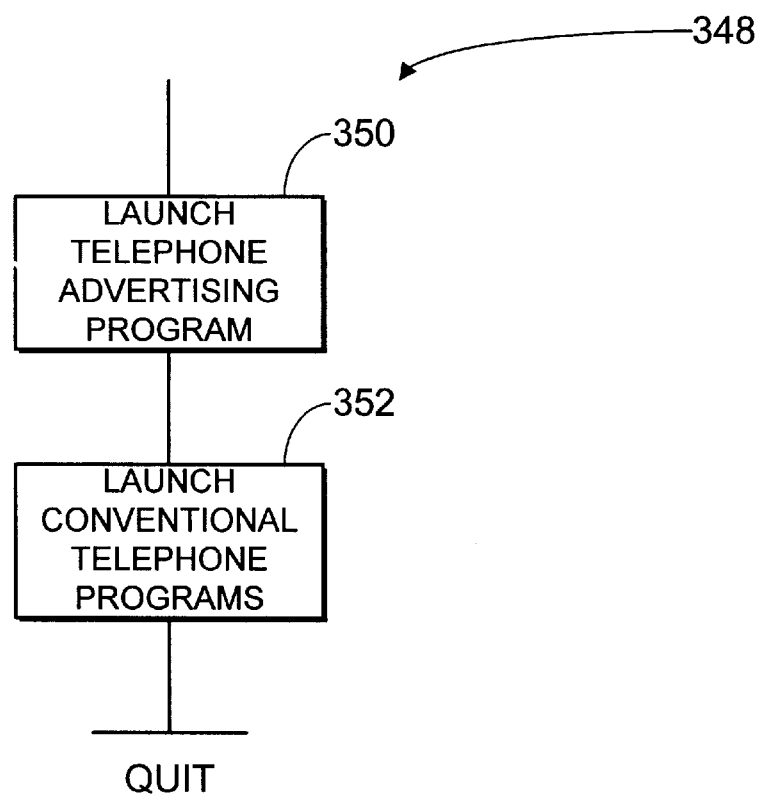
FIG. 14 is a flowchart of a telephone program according to the first embodiment of the invention.

Referring to FIG. 14, the telephone service program is shown generally at 348. This program begins with block 350 which launches a telephone advertising program shown in FIG. 15.

FIG. 15

Figure 15:
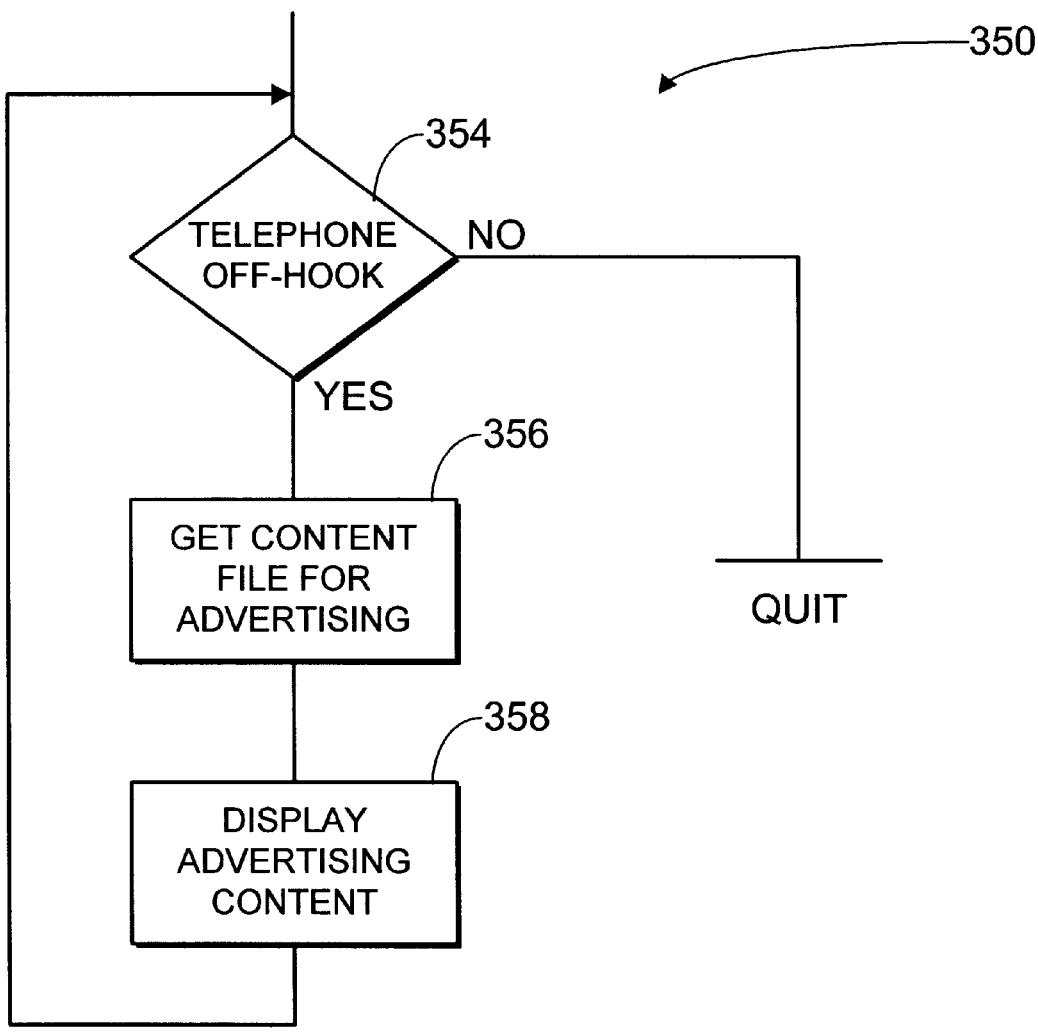
FIG. 15 is a flowchart of a telephone advertising program according to the first embodiment of the invention.

Referring to FIG. 15, the telephone advertising program is shown generally at 350. The program begins with block 354 which directs the processor to read the second communications port 102 to determine whether or not the pay phone interface 106 indicates that the central office line is offhook. If the central office line is not offhook, the telephone advertising program is ended and the telephone program is ended.

If, on the other hand, at block 354 the central office line is offhook, block 356 directs the processor to retrieve a content file 130 from the non-volatile memory 84 to obtain display advertising content. Such content is loaded into the display buffer and the processor is directed to block 358 which directs the processor to run a display advertising program to cause advertising to be displayed on the display 92 while the telephone is in use.

Referring back to FIG. 14, upon launching the telephone advertising program, block 352 launches a conventional telephone routine program.

The conventional telephone routines include routines which receive visual information and drivers contained within the core program layer 158 serve to take control of, at least, a portion of the display 92 to provide various pay telephone options to the user. Thus, the multimedia apparatus is used to display options for pay telephone usage. In addition, further drivers allow the user to enter answers to options presented on the display, using the keyboard to enter user names, calling card numbers, etc. In response to such input received from a user, certain functionality of the pay phone is rendered operational. Thus, the multimedia apparatus is operable to display and receive information relating to the operation of the pay telephone.

Applications

Referring back to FIG. 6, the apparatus also includes an idle terminal program shown generally at 320. This program is run when no messages have been received and no service requests have been made, ie. the apparatus is idle.

Referring to FIG. 18, the idle terminal program begins with block 322 which directs the processor to retrieve a content file from the non-volatile memory. The content file includes multimedia display and sound information for displaying and annunciating advertising while the apparatus is idle or, in other words, not in operation by the user. Such advertising may be used to attract users to the apparatus or to simply expose users to advertising. After retrieving such advertising information, block 324 directs the processor to launch a display image program to cause the display 92 and speakers to be driven by graphics files and sound byte files accordingly. Thus, the idle terminal program acts as an idle program for automatically producing a display image at the public communications services Kiosk when the public communications services Kiosk is not in use, In addition, the display program acts as a display image program for producing a display image at the public communications services Kiosk apparatus in response to the contents of the content file.

Referring back to FIG. 6, the applications programs including the messaging services, vertical market, electronic commerce and entertainment programs, retrieve from the content file, HTML pages which interact with the custom web browser 168 in the virtual machine layer of the apparatus architecture. Effectively therefore, content providers associated with these applications, are able to submit HTML pages to the administrative staff terminal 78 shown in FIG. 3 for inclusion by the content manager interface 60 in content files stored in the database 62. The administrative staff terminal 78 then directs the terminal configuration interface 58 to make a notation in a configuration file, identifying content files which are to be made available to users and the configuration file and content files are sent to Kiosk apparatus 36 by the file server interface 48.

At the apparatus receiving such files, when a multimedia service is launched, effectively the content files specified by the configuration file are made available to the web browser as HTML pages. By receiving content from content providers in the HTML page format, a relatively standard, uniform interface for receiving such information is provided rendering the apparatus extremely functional with an open architecture.

Generally, HTML pages, in this embodiment, are designed to cooperate with a physical screen size of 800 pixels wide by 600 pixels high. In addition, each HTML page is intended to be compatible with NETACAPE NAVIGATOR 3.01 (Trademark) upon which the custom web browser 168 shown in FIG. 6 is based. The browser, however, is customized in that it is programmed to respond to non-conventional HTML commands including a Kiosk:print command, a Kiosk:quit command, a Kiosk:phone command, a Kiosk:help command and a Kiosk:card command. In addition, the web browser is customized to be responsive to JAVA and JAVASCRIPT (trademark).

In this embodiment, the HTML pages provided by content providers are designed to define virtual buttons on the display, such that the user can employ the touchscreen to signify actuation of a button shown in the display to cause the function associated with such button to be effected. Scrolling of a large HTML page is provided by actuation of the scroll actuators shown generally at 32 in FIG. 1.

The functionality associated with certain virtual buttons specified by an HTML page may involve the dispatch of uniform resource locators (URLs) to web addresses on the World Wide Web. Referring back to FIG. 3, such URLs are received at the web server interface 46 which sends the URL through the Internet gateway interface 44 to the Internet 40 to access the identified web site and download an HTML page associated with such web site. The HTML page to be downloaded is received at the Internet gateway interface 44 from the Internet 40 and the Internet gateway interface 44 forwards the HTML page to the web server interface 46 which forwards the HTML page to the requesting apparatus via the HTML/applet pipe 64.

At the apparatus, the HTML page is received by the custom web browser 168 which executes the functionality specified by the downloaded HTML page.

Any HTML page provided from an external World Wide Web site or from a content provider, may include one of the additional HTML commando referred to above.

In connection with these commands, the Kiosk:print command is used to cause the printer 31, shown in FIG. 4 to print simple, unformatted strings.

The Kiosk:quit command provides a vehicle to exit a web-based application or HTML page of a current content provider.

The Kiosk:phone command includes a URL definition which is interpreted by the web browser as a request to dial a telephone number. Thus, for example, the content provider may present a display with a plurality of buttons, resembling an automatic dialler and upon contacting the touchscreen adjacent one of such buttons, the Kiosk:phone command is invoked to cause a telephone number to be dialled. Thus, the microprocessor takes control of the telephone interface, causing the telephone line to go offhook. A timeout period may then be provided to allow the user time to pick up the handset which, if not picked up, will direct the microprocessor to terminate the telephone call.

The Kiosk:help command is associated with a URL defining a help window within which there may be a Kiosk:phone command which provides immediate access to a help desk operated by the content provider.

The Kiosk:card command directs the web browser to present to the user, display indicia requesting the user to insert a credit card or debit card to which a purchase of services or merchandise is to be applied. After the card has been read, the web browser calls a result URL predefined by the content provider. This command is associated with certain parameters such as a clear parameter indicating whether or not the vender is to clear the card or whether the operator of the central server is to clear the card, a card type parameter which lists card types supported, an amount field identifying the dollar amount of the transaction, a transaction type to identify a sale or return, a prompt operable to override any default prompt provided by the web browser, an authorization number for providing an authorization number associated with the charge, an operator identification for use with debit card transactions and a product information parameter for information such as delivery address, buyer name, model number, etc.

Card purchases

FIG. 16

Figure 16:
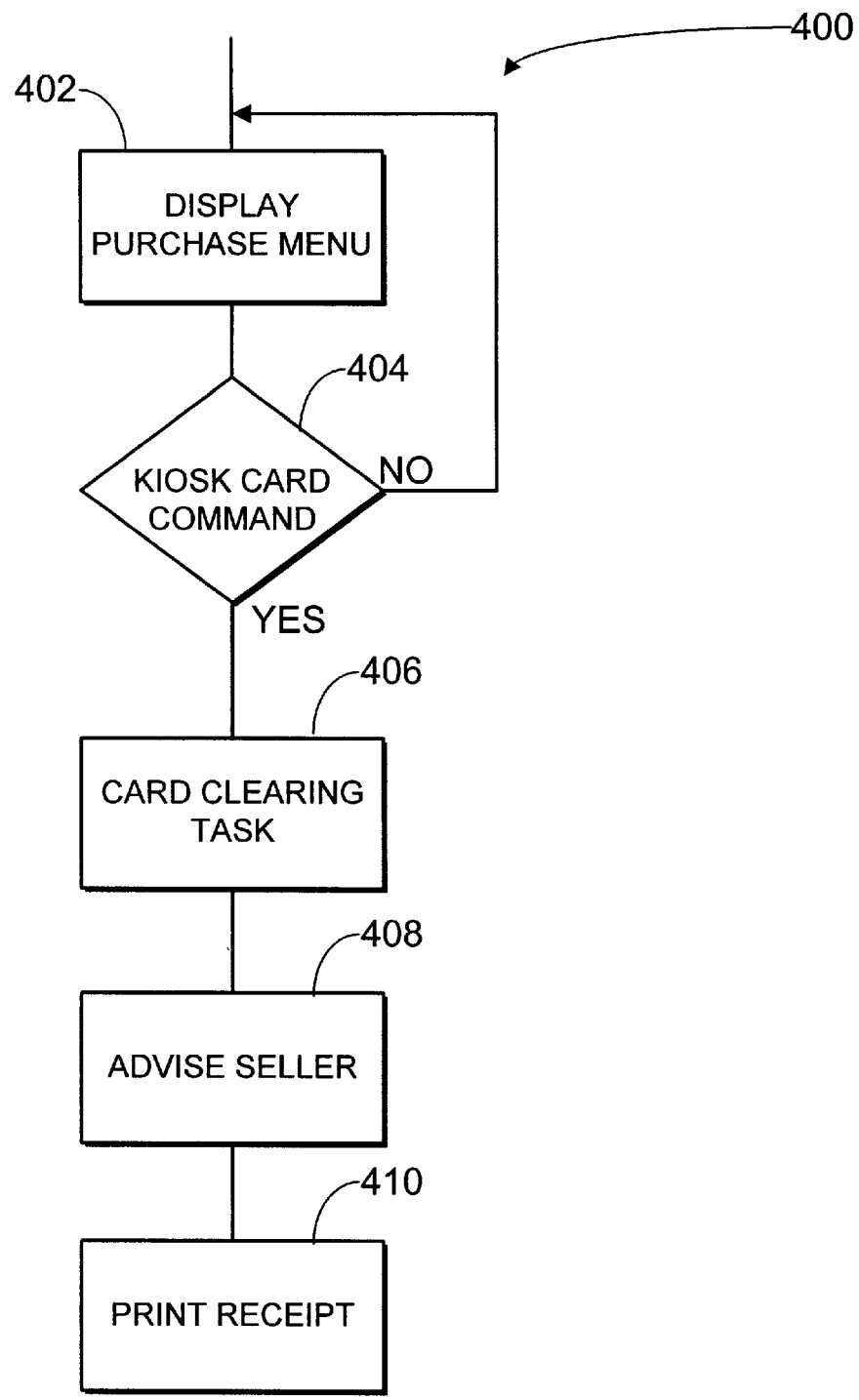
FIG. 16 is a flowchart of a load content HTML page program according to the first embodiment of the invention.

Referring to FIG. 16, a card purchase program for allowing a user to purchase a service or goods provided by a content provider is shown generally at 400. Effectively, the content provider creates an HTML order page including a "Kiosk:card" command. When the user requests a service which allows a user to purchase goods or services, the web browser calls the HTML page associated with the related content provider. In response to the HTML page, a display purchase menu, specified in the HTML page by the content provider, is displayed as indicated at 402. Within this display, a virtual button associated with a Kiosk:card command is included. If the user actuates the button, block 404 detects the issuance of the Kiosk:card command which directs the processor to launch a card clearing task 406 shown in FIG. 17.

Card clearing task

FIG. 17

Referring to FIG. 17, the card clearing task begins with block 360 which directs the processor to actuate the card reader to identify the type of card. Block 362 then directs the processor to a lookup table which is addressed to determine whether or not the card inserted is supported by the apparatus. If the card is not supported, block 364 directs the processor to reject the card. If the card is supported, however, block 366 directs the processor to perform a card format and valid data test on the data read from the card. If the card format or data is not valid, block 368 directs the processor to reject the card.

If the card information is valid, block 370 directs the processor to send the card data to the central server 26 by way of a message sent through the request and reply pipe 68 shown in FIG. 3 to the transaction server interface 50.

Referring back to FIG. 3, the transaction server then looks up local card clearing files stored in the database 62 to determine whether or not the card should be rejected and if, based on these files, the card should be rejected, a reply message to this effect is sent back to the apparatus. This reply message is received by the apparatus as indicated at block 372 and block 374 directs the processor to reject the card. If the server determines that the card should not be rejected, a message to this effect is sent back to the apparatus where block 376 directs the processor to determine, by reference to the HTML page containing such information, whether or not the goods or services presented by the content provider for purchase can be purchased or acquired by pre-authorization. In other words, there is a code in the HTML file indicating whether or not the goods or services sought by the user can be purchased outright or purchased on the basis of a pre-authorization.

If the goods or services can be obtained by pre-authorization, block 378 directs the processor to prepare a request to send to the server to obtain clearance from the credit card service 70. Alternatively, if the goods or services must be purchased without pre-authorization, block 380 directs the processor prepare a request message including the purchase price of the goods or services sought by the user and to send the request message to the server via the request and reply pipe 68. The request message is received at the transaction server interface 50 which queries the credit card service 70 for validation of the purchase and card information. If such information is validated by credit card service 70, the credit card service issues a reply message to the transaction server interface 50 which forwards such message via the request and reply pipe 68 to the requesting apparatus 36.

Block 382 directs the processor to read the reply message to determine whether or not the card has been accepted by the credit card service. If the card has not been accepted, block 384 directs the processor to reject the card. On the other hand, if the card is accepted, block 386 directs the processor to allow the purchase to proceed.

Referring back to FIG. 16, block 408 then directs the processor to advise the seller of the purchase by sending a message through the HTML applet pipe 64 to the web server interface 46 and though the Internet gateway interface 44 to the Internet and to the content provider. In response, the content provider issues a Kiosk:print command, which is received via the web server at the requested apparatus and which is interpreted by the microprocessor as a request to print information accompanying the Kiosk:print command at the printer 31. Block 410 directs the processor to print a receipt for the transaction just enacted.

Alternatives

As an alternative to suspending the operation of the usage timer when the receive data rate is less than the predefined value, an alternative apparatus includes first timers associated with respective services, the first timers being started in response to respective requests for access to respective services. In addition, the apparatus includes second timers associated with each service respectively, the second timers being started in response to transmission of special requests to external services, such requests being initiated by the respective services. The apparatus then checks each of the second timers to determine whether or not any of such timers holds a value greater than a predefined value associated with its respective service. Corresponding first timers are disabled for each service having a second timer having a value greater than a predefined value. The first timers are re-enabled when the service has received a response to its request. In effect, this amounts to timing the time taken to receive a response to a request and if the time taken exceeds a predefined value, suspending charging the user while the data is received. The steps of billing and producing a billing record as described above, are generally the same.

More generally, the apparatus according to the second embodiment records times during which a plurality of respective services are in operation and suspends the recording of such times for each service waiting for data for a period of time greater than a predetermined time, until the data is received.

In addition, generally there is a first timer for recording time during which a service is in operation and there is a second timer rendered operable when the service requests data, the second timer being operable to disable the first timer to suspend the recording of time when the second timer acquires a value exceeding a predefined value representing the time during which the service is waiting for data, in response to a request for data, and the second timer re-enabling the first timer when the data is received.

Each service may have a respective predefined value and thus, effectively, each first timer is suspended in operation or paused, according to its own predefined value.

While specific embodiments of the invention have been described and illustrated, such embodiments should be considered illustrative of the invention only and not as limiting the invention as construed in accordance with the accompanying claims.

What is claimed is:

1. A method of recording actual time used by a service which makes requests and waits for data in response to said requests, the method comprising:
   a) recording time during which said service is in operation;
   b) determining the duration of time during which said service is waiting for data in response to a request for data; and c) suspending the recording of said time when said duration of time exceeds a pre-defined duration.

2. A method as claimed in claim 1 further comprising:

starting a first timer in response to a request for access to said service;

starting a second timer in response to transmission of a request for data;

checking said second timer to determine whether or not it holds said value greater than a pre-defined value and disabling said first timer when said second timer holds a value greater than the pre-defined value; and re-enabling said first timer when said data is received.

3. A method as claimed in claim 2 further comprising producing a billing record identifying said service, a time value accumulated on said first timer and a charge amount associated with said service, said charge amount being calculated from rate information associated with said service and the time value accumulated on said first timer.

4. A method as claimed in claim 1 further comprising:

recording a plurality of times during which respective services are in operation; and suspending the recording of each of said times for each respective service waiting for data for a period of time greater than a pre-determined time until said data is received.

5. A method as claimed in claim 4 further comprising:

starting respective first timers in response to respective requests for access to said data;

starting respective second timers in response to transmission of respective requests for said data;

checking each of said respective second timers to determine whether or not any of said second timers holds a value greater than a pre-defined value and disabling said first timers associated with each service having a second timer with a value greater than said pre-defined value; and re-enabling the first timers associated with each service which has received a response to its request for data.

6. A method as claimed in claim 5 further comprising storing a plurality of pre-defined values and associating separate pre-defined values with each service.

7. A method as claimed in claim 5 further comprising producing a billing record identifying each service requested by a user, each time value accumulated on each first timer associated with each service requested by said user respectively and a charge amount associated with each service, said charge amount being calculated from rate information associated with said each service respectively and the time indicated by said first timers associated with each service respectively.

8. A method of recording actual time used by a service which receives data at various data rates, the method comprising:

a) determining the rate at which data is received at said service;

b) recording time during a period in which said service is in operation and in which said rate at which data is received is greater than a predefined rate, and c) suspending the recording of said time during periods during which the rate at which data is received is less than said pre-defined rate.

9. A method as claimed in claim 8 further comprising:

enabling a first timer in response to a request for usage of said service;

determining a receive data rate at which data is received in response to said request; and comparing said receive data rate with a pre-defined rate value and disabling said first timer when said receive data rate is less than said pre-defined rate value and re-enabling said first timer when said receive data rate exceeds said pre-defined rate value.

10. A method as claimed in claim 8 further comprising:

recording times associated with a plurality of respective services, while data is received at each of said respective services at a rate exceeding said pre-defined rate; and suspending the recording of said times associated of said respective services during periods when data is received by said respective services at a rate less than said pre-defined rate.

11. A method as claimed in claim 10 further comprising:

enabling timers associated with said respective services in response to a request for usage of said services;

determining respective receive data rates at which data is received in response to a request for data by a respective service; and for each of said respective services, comparing said receive data rate with at least one pre-defined rate value and disabling said timer when said receive data rate is less than said pre-defined rate value and re-enabling said timer when said receive data rate exceeds said pre-defined rate value.

12. A method as claimed in claim 11 further comprising storing a plurality of pre-defined rate values and associating separate pre-defined rate values with each service.

13. A method as claimed in claim 11 further comprising producing a billing record identifying each service requested by a user, each time value accumulated on each timer associated with each service requested by said user respectively and a charge amount associated with each service, said charge amount being calculated from rate information associated with said each service respectively and the time indicated by said timers associated with each service respectively.

14. An apparatus for recording actual time used by a service which makes requests and waits for data in response to said requests, the apparatus comprising:

a) a first timer for recording time during which said service is in operation; and b) a second timer rendered operable when said service requests data, said second timer being operable to disable said first timer to suspend the recording of said time when said second timer acquires a value exceeding a pre-defined value, representing the time during which said service is waiting for data in response to a request for data, and said second timer being operable to re-enable said first timer when said data is received.

15. An apparatus as claimed in claim 14 further comprising memory for storing rate information relating to a billing for charging a user for the use of said service.

16. An apparatus as claimed in claim 14 further including a billing device for producing a billing record identifying said service, a time value accumulated on said first timer and a charge amount associated with said service, said charge amount being calculated from said rate information associated with said service and the time value accumulated on said first timer.

17. An apparatus as claimed in claim 14 further comprising:

a plurality of first timers associated with respective services for recording times during which respective services are in operation; and a plurality of second timers, each of said second timers being rendered operable when its associated service requests data, said second timers being operable to disable said respective first timers to suspend the recording of said time for a service when said second timer associated with said service acquires a value exceeding said pre-defined value, representing the time during which said service is waiting for data in response to a request for data, and said second timers being operable to re-enable respective said first timers when said data is received.

18. An apparatus as claimed in claim 17 further comprising memory for storing a plurality of pre-defined values and associating separate pre-defined values with each service.

19. An apparatus as claimed in claim 18 further comprising memory for storing rate information relating to a billing for charging a user for the use of said service.

20. An apparatus as claimed in claim 19 further comprising a billing device for producing a billing record identifying each service requested by said user, each time value accumulated on each first timer associated with each service requested by said user respectively and a charge amount associated with each service, said charge amount being calculated from said rate information associated with said each service respectively and the time indicated by said first timers associated with each service respectively.

21. An apparatus for recording actual time used by a service, the apparatus comprising:

a) a first timer for recording time during a period in which said service is in operation; and b) a data rate determiner for determining a rate at which data is received, said data rate determiner being in communication with said first timer for disabling said first timer during periods during which the rate at which data is received is less than a pre-defined rate.

22. An apparatus as claimed in claim 21 further comprising:

a plurality of first timers for recording times during respective periods in which respective services are in operation; and at least one data rate determiner for determining respective data rates at which data is received by each of said services and for disabling the first timers of each service receiving data at a data rate less than a pre-defined rate value and for re-enabling said first timers when said data rate exceeds said pre-defined rate value.

23. An apparatus as claimed in claim 22 further comprising memory for storing a plurality of pre-defined rate values, each rate value being associated with a respective service.

24. An apparatus as claimed in claim 23 further comprising a billing device for producing a billing record identifying each service requested by a user, each time value accumulated on each first timer associated with each service requested by said user respectively and a charge amount associated with each service, said charge amount being calculated from rate information associated with said each service respectively and the time value accumulated on said first timers associated with each service respectively.

25. A method of recording actual time used by a service operable to receive data at various rates, the method comprising:

a) recording time with a first timer during a period in which said service is in operation;

b) determining a rate at which data used by said service is received; and c) disabling said first timer during periods during which the rate at which data is received is less than a pre-defined rate.

26. A method as claimed in claim 25 further comprising:

recording times with a plurality of first timers during respective periods in which respective services are in operation;

determining respective data rates at which data is received by each of said services;

disabling the first timers of each service receiving data at a rate less than a pre-defined rate value; and re-enabling disabled first timers when said data rate associated with a corresponding service exceeds said pre-defined rate value.

27. A method as claimed in claim 26 further comprising storing a plurality of pre-defined rate values, each rate value being associated with a respective service.

28. A method as claimed in claim 27 further comprising producing a billing record identifying each service requested by a user, each time value accumulated on each first timer associated with each service requested by said user respectively and a charge amount associated with each service, said charge amount being calculated from rate information associated with said each service respectively and the time value accumulated on said first timers associated with each service respectively.

* * * * *